(12) United States Patent
Kouka et al.

(10) Patent No.: US 12,359,051 B2
(45) Date of Patent: Jul. 15, 2025

(54) LATEX FOR ADHESIVE COMPOSITION AND ADHESIVE COMPOSITION

(71) Applicant: SHOWA DENKO K. K., Tokyo (JP)

(72) Inventors: Hiroto Kouka, Himeji (JP); Yasuhiro Nakagawa, Shanghai (CN)

(73) Assignee: Resonac Corporation, Tokyo (JP)

( * ) Notice: Subject to any disclaimer, the term of this patent is extended or adjusted under 35 U.S.C. 154(b) by 698 days.

(21) Appl. No.: 17/049,164

(22) PCT Filed: Apr. 23, 2019

(86) PCT No.: PCT/JP2019/017261
§ 371 (c)(1),
(2) Date: Oct. 20, 2020

(87) PCT Pub. No.: WO2019/208573
PCT Pub. Date: Oct. 31, 2019

(65) Prior Publication Data
US 2021/0238402 A1 Aug. 5, 2021

(30) Foreign Application Priority Data
Apr. 23, 2018 (JP) .................................. 2018-081945

(51) Int. Cl.
| | |
|---|---|
| C08L 33/02 | (2006.01) |
| C08F 2/26 | (2006.01) |
| C08F 2/38 | (2006.01) |
| C08F 220/06 | (2006.01) |
| C08F 220/14 | (2006.01) |
| C08F 220/18 | (2006.01) |
| C08F 220/20 | (2006.01) |
| C08F 220/32 | (2006.01) |
| C08F 222/02 | (2006.01) |
| C08K 5/42 | (2006.01) |
| C09J 11/06 | (2006.01) |
| C09J 111/02 | (2006.01) |
| C09J 133/02 | (2006.01) |

(52) U.S. Cl.
CPC .............. *C08L 33/02* (2013.01); *C08F 2/26* (2013.01); *C08F 2/38* (2013.01); *C08F 220/06* (2013.01); *C08F 220/14* (2013.01); *C08F 220/1808* (2020.02); *C08F 220/20* (2013.01); *C08F 220/325* (2020.02); *C08F 222/02* (2013.01); *C08K 5/42* (2013.01); *C09J 11/06* (2013.01); *C09J 111/02* (2013.01); *C09J 133/02* (2013.01); *C08L 2201/52* (2013.01); *C08L 2205/18* (2013.01)

(58) Field of Classification Search
None
See application file for complete search history.

(56) References Cited

U.S. PATENT DOCUMENTS

| | | | | |
|---|---|---|---|---|
| 2008/0128083 A1* | 6/2008 | Williams | ............... | C09J 111/02 156/333 |
| 2010/0099318 A1* | 4/2010 | Suzuki | ................... | C09J 133/08 442/151 |
| 2012/0238678 A1* | 9/2012 | Minorikawa | .......... | C09J 111/02 524/156 |
| 2014/0137435 A1* | 5/2014 | Yano | .................. | C09J 123/0846 36/83 |
| 2015/0057399 A1 | 2/2015 | Ohnishi | | |

FOREIGN PATENT DOCUMENTS

| | | | | |
|---|---|---|---|---|
| EP | 2 508 560 A1 | 10/2012 | | |
| EP | 3260488 A1 * | 12/2017 | ............... | C08K 3/38 |
| JP | 60-137978 A | 7/1985 | | |
| JP | 61-023614 A | 2/1986 | | |
| JP | 04-298536 A | 10/1992 | | |
| JP | 09003423 A * | 1/1997 | | |
| JP | 10001653 A * | 1/1998 | | |
| JP | 10-195406 A | 7/1998 | | |
| JP | 2002-285122 A | 10/2002 | | |
| JP | 2003082309 A * | 3/2003 | | |
| JP | 2006-83302 A | 3/2006 | | |
| JP | 2007-332207 A | 12/2007 | | |
| JP | 2013-531105 A | 8/2013 | | |
| JP | 2013253136 A * | 12/2013 | ............ | C08F 220/18 |
| JP | 2015-199955 A | 11/2015 | | |

(Continued)

OTHER PUBLICATIONS

JP-2003082309-A, Mar. 2003, Machine translation (Year: 2003).*
JP-09003423-A,, 1997, machine translation (Year: 1997).*
JP-2013253136-A, 2013, machine translation (Year: 2013).*
JP 10-001653 A,, Jan. 1998 machine translation (Year: 1998).*
International Search Report of PCT/JP2019/017261 dated Jul. 16, 2019 [PCT/ISA/210].
Office Action issued Dec. 16, 2021 in Russian Application No. 2020134351.

(Continued)

*Primary Examiner* — Satya B Sastri
(74) *Attorney, Agent, or Firm* — Sughrue Mion, PLLC

(57) ABSTRACT

The present invention relates to (1) a latex for an adhesive composition, the latex for an adhesive composition (A) containing a polymer of an ethylenic unsaturated monomer (a1), a surfactant (a2), and an aqueous medium, the polymer of an ethylenic unsaturated monomer (a1) having a carboxy group, the polymer of an ethylenic unsaturated monomer (a1) having an average particle diameter of 0.30 to 5.00 μm, (2) a latex for an adhesive composition, the latex for an adhesive composition (A) containing a polymer of an ethylenic unsaturated monomer (a1), a surfactant (a2), and an aqueous medium, the polymer of an ethylenic unsaturated monomer (a1) having a carboxy group and a crosslinked structure, and (3) an adhesive composition containing the latex for an adhesive composition (A) and a chloroprene based polymer latex (B).

26 Claims, No Drawings

(56) References Cited

FOREIGN PATENT DOCUMENTS

| RU | 2044023 C1 | 9/1995 |
|---|---|---|
| TW | 201638271 A | 11/2016 |
| WO | 2011/065524 A1 | 6/2011 |
| WO | 2013/141170 A1 | 9/2013 |
| WO | 2016/133192 A1 | 8/2016 |
| WO | 2019/208573 A1 | 10/2019 |

OTHER PUBLICATIONS

BASF, Safety data sheet of Acronal S 600 ap, 2023, Version 1.1, 4th Revision (12 pages).
Noveon, Inc., Carbopol Aqua SF-1 Polymer Technical Data Sheet, Dec. 2000, TDS-294, pp. 1-9 (9 pages).
Tosoh Corporation, Skyprene latex grade, Grade configuration and features, 2014 (6 pages).
Microtrac, Nanotrac Series catalog, "Proprietary Probe Technology Proposed", 2021 (38 pages).
Microtrac, homepage, "What is the difference between number distribution and mass (volume) distribution in particle size measurement?" 2023 (17 pages) Accessed via the Internet: https://www.microtrac.com/jp/applications/knowledge-base/difference-mass-distribution/.
Masafumi Arakawa, "Introduction to Particle Size Measurement", Journal of the Society of Powder Technology, 1980, vol. 17, No. 6, pp. 299-307 (28 pages).
Office Action dated Aug. 28, 2023 issued in Japanese Patent Application No. 2020-515488 with response thereto; 33 pages total.
Toshio Sakomura, et al., "Effect of Molecular Weight and Crystallization Rate of Polychloroprene on Its Adhesive Properties", 1970 (18 pages including translation).

* cited by examiner

LATEX FOR ADHESIVE COMPOSITION AND ADHESIVE COMPOSITION

CROSS REFERENCE TO RELATED APPLICATIONS

This application is a National Stage of International Application No. PCT/JP2019/017261, filed Apr. 23, 2019, claiming priority to Japanese Patent Application No. 2018-081945, filed Apr. 23, 2018.

TECHNICAL FIELD

The present invention relates to a latex for an adhesive composition and an adhesive composition. In particular, the present invention relates to a latex for an adhesive composition containing a polymer of an ethylenic unsaturated monomer, and an adhesive composition containing the latex for an adhesive composition and a chloroprene based polymer latex.

BACKGROUND ART

A vinyl acetate based polymer, a chloroprene based polymer, an acrylate ester based polymer, natural rubber, a urethane based polymer, and the like have been used as a polymer for an adhesive. Among these, a chloroprene based polymer has been favorably applied to adhesive purposes, such as a solvent contact adhesive and a graft adhesive, due to the high adhesion force provided thereby to various adherends under a low bonding pressure. In response to the volatile organic compound (VOC) regulation and the solvent regulation in recent years, a chloroprene rubber based aqueous adhesive using a chloroprene polymer latex is being actively developed.

The chloroprene based polymer latex has an advantage that the period of time until the adhesion force is exhibited is short, i.e., good contact property, due to the crystallization thereof in drying. On the other hand, the chloroprene based polymer latex used alone is insufficient in the initial adhesion force in the use thereof as a one-component aqueous adhesive composition. Accordingly, it has been considered to blend with a polymer of another kind for supplementing the characteristics including the initial adhesion force, and the like.

For example, PTL 1 describes a method of blending an acrylic resin based polymer latex and a urethane resin based polymer latex with a polychloroprene latex.

PTL 2 describes a technique of adding a polyoxyalkylene alkyl ether sulfate salt and a pH modifier as additives to a polychloroprene latex.

PTL 3 describes a technique of adding an acrylic resin based latex and a polyoxyalkylene alkyl ether sulfate salt as a surfactant to a chloroprene based polymer latex.

CITATION LIST

Patent Literatures

PTL 1: JP 10-195406 A
PTL 2: JP 2007-332207 A
PTL 3: WO 2011/065524 (European Patent No. 2508560)

SUMMARY OF INVENTION

Technical Problem

However, the latexes have stable pH regions different from each other, and therefore only the blend of the latex therewith as in PTL 1 is insufficient for achieving the initial adhesion force.

In the case where the stability of the latex is to be secured with a surfactant as in PTLs 2 and 3, the amount of the surfactant used is increased to cause a problem that the gelation of the chloroprene based polymer in drying is hard to proceed to fail to secure the sufficient initial adhesion force.

In view of the above, a problem to be solved by the present invention is to provide a latex for an adhesive composition that is capable of providing a large adhesion force in a short period of time, in mixing with a chloroprene based polymer latex.

Another problem to be solved by the present invention is to provide an adhesive composition that is capable of providing a large adhesion force in a short period of time.

Solution to Problem

The present invention solving the aforementioned problems includes the following items [1] to [21].

[1] A latex for an adhesive composition, the latex for an adhesive composition (A) containing a polymer of an ethylenic unsaturated monomer (a1), a surfactant (a2), and an aqueous medium, the polymer of an ethylenic unsaturated monomer (a1) having a carboxy group, the polymer of an ethylenic unsaturated monomer (a1) having an average particle diameter of 0.30 to 5.00 µm.

[2] The latex for an adhesive composition according to the item 1, wherein the polymer of an ethylenic unsaturated monomer (a1) has an average particle diameter of 0.50 to 3.00 µm.

[3] The latex for an adhesive composition according to the item 1 or 2, wherein the polymer of an ethylenic unsaturated monomer (a1) has a structural unit derived from an ethylenic unsaturated monomer having a carboxy group and a structural unit derived from an ethylenic unsaturated monomer having a functional group having reactivity with a carboxy group.

[4] The latex for an adhesive composition according to any one of the items 1 to 3, wherein the polymer of an ethylenic unsaturated monomer (a1) has a structural unit derived from a crosslinkable ethylenic unsaturated monomer having plural ethylenic unsaturated bonds in a molecule.

[5] The latex for an adhesive composition according to any one of the items 1 to 4, wherein the polymer of an ethylenic unsaturated monomer (a1) has a crosslinked structure.

[6] A latex for an adhesive composition, the latex for an adhesive composition (A) containing a polymer of an ethylenic unsaturated monomer (a1), a surfactant (a2), and an aqueous medium, the polymer of an ethylenic unsaturated monomer (a1) having a carboxy group and a crosslinked structure.

[7] The latex for an adhesive composition according to any one of the items 1 to 6, wherein the polymer of an ethylenic unsaturated monomer (a1) contains at least one of a structural unit derived from an ethylenic unsaturated monomer having an epoxy group, a structural unit derived from a silane coupling agent having an ethylenic unsaturated bond, and a structural unit derived from a monomer containing two or more ethylenic unsaturated bonds.

[8] The latex for an adhesive composition according to any one of the items 1 to 7, wherein the polymer of an ethylenic unsaturated monomer (a1) contains a structural unit derived from an ethylenic unsaturated monomer having two or more carboxy groups in a molecule.

[9] The latex for an adhesive composition according to any one of the items 1 to 8, wherein the polymer of an ethylenic unsaturated monomer (a1) contains a structural unit derived from an ethylenic unsaturated monomer having one or more hydroxy group in a molecule.

[10] The latex for an adhesive composition according to any one of the items 1 to 9, wherein the polymer of an ethylenic unsaturated monomer (a1) contains at least one of (meth)acrylic acid and itaconic acid as a structural monomer unit.

[11] The latex for an adhesive composition according to any one of the items 1 to 10, wherein the surfactant (a2) contains a surfactant represented by the following general formula (1):

$$RO-(CH_2CH_2O)_n-SO_3M \quad (1)$$

wherein R represents a hydrocarbon skeleton containing at least one kind selected from the group consisting of a saturated or unsaturated aliphatic skeleton having an average number of carbon atoms of 5 to 20, a saturated or unsaturated alicyclic skeleton having an average number of carbon atoms of 5 to 20, and an aromatic skeleton having an average number of a ring structure of 1 to 10; M represents sodium or ammonium; and n (average value) is 2 to 60.

[12] The latex for an adhesive composition according to any one of the items 1 to 11, wherein the latex has a neutralization degree of 0.3 to 1.3.

[13] An adhesive composition containing the latex for an adhesive composition (A) according to any one of the items 1 to 12, and a chloroprene based polymer latex (B).

[14] The adhesive composition according to the item 13, wherein the chloroprene based polymer latex (B) contains an anionic surfactant having a carboxy group.

[15] The adhesive composition according to the item 13 or 14, wherein the adhesive composition has a mixing ratio of the latex for an adhesive composition (A) and the chloroprene based polymer latex (B) in terms of mass ratio of solid contents of 10/90 to 90/10.

[16] The adhesive composition according to any one of the items 13 to 15, wherein the adhesive composition has a mixing ratio of the latex for an adhesive composition (A) and the chloroprene based polymer latex (B) in terms of mass ratio of solid contents of 25/75 to 70/30.

[17] The adhesive composition according to any one of the items 13 to 16, wherein the adhesive composition further contains a pH modifier.

[18] An article including porous members, or a porous member and another member, adhered with the adhesive composition according to any one of the items 13 to 17.

[19] An article including water-absorbing members, or a water-absorbing member and another member, adhered with the adhesive composition according to any one of the items 13 to 17.

[20] A member for furniture and automobile interior, including the article according to the item 18 as a cushion material.

[21] A building material including the article according to the item 19 in a structure.

Advantageous Effects of Invention

According to the present invention, a latex for an adhesive composition that is capable of providing a large adhesion force in a short period of time, in mixing with a chloroprene based polymer latex can be provided.

According to the present invention, an adhesive composition that is capable of providing a large adhesion force in a short period of time can be provided.

DESCRIPTION OF EMBODIMENTS

Embodiments of the present invention will be described below. In the description herein, the adhesive composition means a chloroprene rubber based adhesive.

In the description herein, the numerals with "to" intervening therebetween mean a value that is the numeral before "to" or more and the numeral after "to" or less.

In the description herein, the "(meth)acrylic" is a generic term of acrylic and methacrylic, and the "(meth)acrylate" is a generic term of acrylate and methacrylate.

In the description herein, the "solid content" means all the components except for a solvent.

In the description herein, the "average particle diameter" means a particle diameter at 50% in a volume-based cumulative particle diameter distribution measured by the dynamic light scattering method.

The adhesive composition in the present invention contains a latex for an adhesive composition (A), a chloroprene based polymer latex (B), and an aqueous medium. The initial adhesion force and the contact property of the adhesive composition of the present invention are capabilities derived from the gelation acceleration by the latex (A) and the crystallization of the chloroprene based polymer, which are different in mechanism of adhesion from the ordinary acrylic based pressure-sensitive adhesives. The components contained in the adhesive composition will be described below.

[Latex for Adhesive Composition (A)]

Two embodiments will be described for the latex for an adhesive composition (A) according to the present invention, but the present invention is not limited to the two embodiments. In the description below, a latex for an adhesive composition ($A_1$) in the embodiment 1 and a latex for an adhesive composition ($A_2$) in the embodiment 2 each are one embodiment of the latex for an adhesive composition (A). A polymer of an ethylenic unsaturated monomer ($a_1$1) in the embodiment 1 and a polymer of an ethylenic unsaturated monomer ($a_2$1) in the embodiment 2 each are one embodiment of the polymer of an ethylenic unsaturated monomer (a1). A surfactant ($a_1$2) in the embodiment 1 and a surfactant ($a_2$2) in the embodiment 2 each are one embodiment of the surfactant (a2).

In the two embodiments above, the constitution according to one of the embodiments does not exclude the constitution according to the other of the embodiments, and the constitution according to one of the embodiments may include the constitution according to the other of the embodiments, as far as the effects of the present invention can be obtained. For example, the polymer of an ethylenic unsaturated monomer ($a_1$1) contained in the latex for an adhesive composition ($A_1$) according to the embodiment 1 described below may have a structural unit derived from the crosslinkable ethylenic unsaturated monomer, which is the constitution of the polymer of an ethylenic unsaturated monomer ($a_1$1) contained in the latex for an adhesive composition ($A_2$) according to the embodiment 2, and may have a crosslinked structure.

1. Embodiment 1 of Latex for Adhesive Composition (A)

The latex for an adhesive composition ($A_1$) according to one embodiment of the present invention (which may be referred to as a "latex ($A_1$)") contains a polymer of an ethylenic unsaturated monomer ($a_1$1), a surfactant ($a_1$2), and an aqueous medium, and the polymer of an ethylenic unsaturated monomer ($a_1$1) has a carboxy group and has an average particle diameter of 0.3 to 5.0 μm. The polymer of an ethylenic unsaturated monomer ($a_1$1) may have a crosslinked structure (which will be described in detail for the embodiment 2 later).

The polymer of an ethylenic unsaturated monomer ($a_1$1) has a carboxy group, and thereby in the use of the adhesive composition of the present invention containing the latex ($A_1$) and the chloroprene based polymer latex (B) mixed with each other, the carboxy group accelerates gelation of the chloroprene based polymer latex, so as to exhibit the excellent initial adhesion force and contact property.

It has been known that in decreasing the pH, the gelation of the chloroprene based polymer latex (B) is accelerated, and then the crystallization of the chloroprene based polymer occurs to exhibit an initial adhesion force. In the case where the latex ($A_1$) has a carboxy group, which is a weak acid, the adhesive composition containing the latex ($A_1$) and the chloroprene based polymer latex (B) mixed with each other has good storage stability without gelation in the storage thereof.

In the use of the adhesive composition of the present invention, on the other hand, the dispersion medium containing water is removed to lower the pH in the system, and thereby the gelation of the chloroprene based polymer rapidly proceeds to exhibit the adhesion force.

The molar number of the carboxy group contained in 1 kg of the solid content of the latex for an adhesive composition ($A_1$) is preferably 0.01 to 1.00 mol, more preferably 0.05 to 0.50 mol, and further preferably 0.10 to 0.40 mol. In the case where the molar number of the carboxy group contained in 1 kg of the solid content of the latex for an adhesive composition ($A_1$) is 0.01 mol or more, the excellent initial adhesion force and contact property can be exhibited in mixing with the chloroprene based polymer latex (B) described later, and in the case where the molar number of the carboxy group contained in 1 kg of the solid content of the latex for an adhesive composition ($A_1$) is 1.00 mol or less, the storage stability in mixing with the chloroprene based polymer latex (B) described later can be enhanced.

1-1. Polymer of Ethylenic Unsaturated Monomer ($a_1$1)

The structural unit constituting the polymer of an ethylenic unsaturated monomer ($a_1$1) is not particularly limited, as far as it is a monomer that has an ethylenic unsaturated bond. Examples of the monomer having an ethylenic unsaturated bond include (meth)acrylic acid, fumaric acid, maleic acid, and esters thereof; (meth)acrylamide and a derivative thereof; styrene and a derivative thereof; a vinyl ester; an N-substituted maleimide compound; and itaconic acid, crotonic acid, phthalic acid, and esters thereof and metal salts and ammonium salts thereof. The monomers having an ethylenic unsaturated bond may be used alone or as a combination of two or more kinds thereof.

1-1-1. Ethylenic Unsaturated Monomer Having Carboxy Group

For introducing a carboxy group to the polymer of an ethylenic unsaturated monomer ($a_1$1), an ethylenic unsaturated monomer having a carboxy group is preferably used as a monomer. Examples of the ethylenic unsaturated monomer having a carboxy group used include (meth)acrylic acid, itaconic acid, carboxyethyl (meth)acrylate, carboxypentyl (meth)acrylate, hexahydrophthalate, 2-(meth)acryloyloxypropyl 2-(meth)acryloyloxyethyl hexahydrophthalate, 2-(meth)acryloyloxyethyl phthalate, 2-(meth)acryloyloxyethyl succinate, 2-(meth)acryloyloxyethyl maleate, carboxypolycaprolactone mono(meth)acrylate, 2-(meth)acryloyloxyethyl tetrahydrophthalate, crotonic acid, maleic acid, citraconic acid, mesaconic acid, fumaric acid, aconitic acid, and anhydrides of these acids. Among these, at least one kind selected from the group consisting of (meth)acrylic acid and itaconic acid is more preferably contained.

The total amount of the structural unit derived from the ethylenic unsaturated monomer having a carboxy group is preferably 0.5 to 5.0% by mass, and more preferably 1.0 to 4.0% by mass, based on the total amount of all the structural units derived from the ethylenic unsaturated monomers constituting the polymer ($a_1$1). In all the structural units derived from the ethylenic unsaturated monomers, the structural unit derived from (meth)acrylic acid and the structural unit derived from itaconic acid are preferably contained in an amount of 1.0 to 4.0% by mass. In the case where in all the structural units derived from the ethylenic unsaturated monomers, the amount of the structural unit derived from the ethylenic unsaturated monomer having a carboxy group is 0.5% by mass or more, the progress rate of the gelation of the adhesive composition containing the chloroprene based polymer latex (B) described later mixed therein can be increased to enhance the contact property. In the case where in all the structural units derived from the ethylenic unsaturated monomers, the amount of the structural unit derived from the ethylenic unsaturated monomer having a carboxy group is 5.0% by mass or less, the viscosity of the adhesive composition containing the chloroprene based polymer latex (B) mixed therein can be decreased to enhance the coating capability.

1-1-2. Hydrophobic Ethylenic Unsaturated Monomer

The monomer constituting the polymer ($a_1$1) may contain and preferably contains a hydrophobic ethylenic unsaturated monomer, in addition to the ethylenic unsaturated monomer having a carboxy group. The hydrophobic ethylenic unsaturated monomer means an ethylenic unsaturated monomer that contains at least one group selected from an aromatic group, a saturated or unsaturated alicyclic group, and a saturated or unsaturated alkyl group having 5 or more carbon atoms, and does not contain a hydrophilic group, such as a hydroxy group, a carboxy group, a sulfo group, and an amino group.

Examples of the hydrophobic ethylenic unsaturated monomer include a styrene derivative, a (meth)acrylate ester, a fumarate ester, a maleate ester, a vinyl ester, an N-substituted maleimide compound, an itaconate ester, a crotonate ester, and a phthalate ester. Specific examples thereof include 2-ethylhexyl (meth)acrylate, isobornyl (meth)acrylate, di(2-ethylhexyl) fumarate, di(2-ethylhexyl) maleate, styrene, methoxystyrene, vinyl divinylbenzenecaprate, vinyl laurate, vinyl stearate, cyclohexyl maleimide, phenyl maleimide, benzyl maleimide, naphthyl maleimide, di(2-ethylhexyl) itaconate, 2-ethylhexyl crotonate, dihexyl phthalate, and di(2-ethylhexyl) phthalate. The hydrophobic ethylenic unsaturated monomers may be used alone or as a combination of two or more kinds thereof.

In the total ethylenic unsaturated monomers constituting the acrylic acid polymer ($a_1 1$), the hydrophobic ethylenic unsaturated monomer is preferably contained in an amount of 50.0 to 99.5% by mass, and more preferably 50.0 to 98.0% by mass. In the case where the amount of the hydrophobic ethylenic unsaturated monomer is 50.0% by mass or more in the total ethylenic unsaturated monomers, the storage stability of the adhesive composition containing the chloroprene based polymer latex (B) described later mixed therein can be enhanced. In the case where the amount of the hydrophobic ethylenic unsaturated monomer is 99.5% by mass or less in the total ethylenic unsaturated monomers, the progress rate of the gelation of the adhesive composition containing the chloroprene based polymer latex (B) mixed therein can be increased to enhance the contact property.

1-1-3. Surfactant Having Ethylenic Unsaturated Bond

The polymer of an ethylenic unsaturated monomer ($a_1 1$) preferably contains a structural unit derived from a surfactant having an ethylenic unsaturated bond since the dispersion stability of the particles can be enhanced. The ethylenic unsaturated monomer having a carboxy group is not encompassed in the surfactant having an ethylenic unsaturated bond. Examples of the surfactant having an ethylenic unsaturated bond include compounds represented by the following chemical formula (2) to (5). In the formulae, the symbols have the same meanings as in the general formula (1) described later.

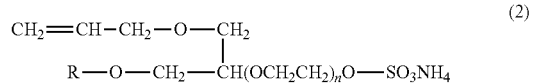
(2)

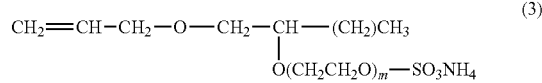
(3)

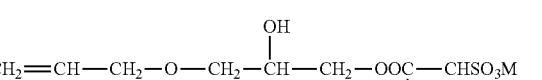
(4)

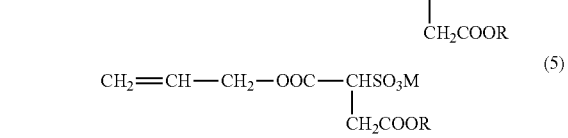
(5)

1-1-4. Additional Ethylenic Unsaturated Monomer

The ethylenic unsaturated monomer in the present invention may contain an ethylenic unsaturated monomer other than the ethylenic unsaturated monomer having a carboxy group and the hydrophobic ethylenic unsaturated monomer. Specific examples thereof include ethylene glycol di(meth)acrylate, methoxyethyl (meth)acrylate, butoxyethyl (meth)acrylate, dimethylaminoethyl (meth)acrylate, diethylaminoethyl (meth)acrylate, hydroxyethyl (meth)acrylate, hydroxypropyl (meth)acrylate, hydroxybutyl (meth)acrylate, ethylene glycol mono(meth)acrylate, polyethylene glycol mono(meth)acrylate, polypropylene glycol mono(meth)acrylate, polytetramethylene glycol mono(meth)acrylate, polyethylene glycol polytetramethylene glycol mono(meth)acrylate, polypropylene glycol polytetramethylene glycol mono(meth)acrylate, glycidyl (meth)acrylate, methylglycidyl (meth)acrylate, 3,4-epoxycyclohexylmethyl (meth) acrylate, ethanediol di(meth)acrylate, propanediol di(meth)acrylate, butanediol di(meth)acrylate, diethylene glycol di(meth)acrylate, dipropylene glycol di(meth)acrylate, trimethylolpropane tri(meth)acrylate, phenoxypolyethylene glycol (meth)acrylate, pentaerythritol tetra(meth)acrylate, dimethyl fumarate, diethyl fumarate, dibutyl fumarate, dimethyl maleate, diethyl maleate, dibutyl maleate, methacrylamide, N-methyl(meth)acrylamide, N-ethyl (meth)acrylamide, N-butyl(meth)acrylamide, N-propyl(meth)acrylamide, methyl vinylbenzoate, vinylbenzyl acetate, hydroxystyrene, vinyl acetate, vinyl propionate, vinyl capronate, methyl maleimide, ethyl maleimide, isopropyl maleimide, dimethyl itaconate, diethyl itaconate, dibutyl itaconate, methyl crotonate, ethyl crotonate, butyl crotonate, dimethyl phthalate, diethyl phthalate, dipropyl phthalate, and dibutyl phthalate. These compounds may be used alone or as a combination of two or more kinds thereof.

[Average Particle Diameter of Polymer ($a_1 1$)]

The average particle diameter of the polymer ($a_1 1$) in the latex ($A_1$) is 0.30 to 5.00 μm, preferably 0.50 to 3.00 μm, and more preferably 0.60 to 2.00 μm.

The method for controlling the average particle diameter to the aforementioned range is not particularly limited, and for example, in the case where the polymer of an ethylenic unsaturated monomer ($a_1 1$) is obtained through emulsion polymerization, preferred examples of the method include a method in which a divalent or higher valent salt, such as a magnesium salt and an aluminum salt, is added during the polymerization, and a method in which the emulsifier concentration during the polymerization is retained low in the initial stage and is gradually increased during the dropwise addition of the monomer emulsion.

In the case where the average particle diameter of the polymer ($a_1 1$) is 0.3 μm or more, the crystallization of the chloroprene based polymer in mixing with the chloroprene based polymer latex (B) may be less inhibited due to the small specific surface area thereof, and the initial adhesion force and the contact property can be enhanced. In the case where the average particle diameter of the polymer ($a_1 1$) is 5.0 μm or less, sedimentation of the fine particles of the polymer ($a_1 1$) may be hard to occur, and the storage stability of the latex ($A_1$) can be enhanced. The average particle diameter is a value at a cumulative frequency of 50% measured by the dynamic light scattering method with "Nanotrac Wave II", produced by MicrotracBEL Corporation.

1-2. Surfactant ($a_1 2$)

The surfactant ($a_1 2$) contained in the latex for an adhesive composition ($A_1$) of the present invention functions as an emulsifier.

The surfactant used may be an anionic surfactant, a nonionic surfactant, and a cationic surfactant, which are commercially available. There is a surfactant that has an ethylenic unsaturated bond and becomes a structural unit of the polymer ($a_1 1$) through polymerization reaction, but the surfactant that has undergone the polymerization reaction does not become the surfactant ($a_1 2$) in the present invention. However, the surfactant having an ethylenic unsaturated bond that remains after the synthesis of the polymer ($a_1 1$) becomes the surfactant ($a_1 2$) in the present invention. The surfactants may be used alone or as a combination of two or more kinds thereof.

Examples of the nonionic surfactant include a polyoxyethylene alkyl ether, a polyoxyalkylene alkyl phenyl ether, a polyoxyethylene polycyclic phenyl ether, a polyoxyalkylene alkyl ether, a sorbitan fatty acid ester, and a polyoxyethylene sorbitan fatty acid ester.

Examples of the cationic surfactant include cetyltrimethylammonium bromide and lauryl pyridinium chloride.

Examples of the anionic surfactant include an alkylbenzene sulfonate, an alkyl sulfate ester salt, a polyoxyethylene alkyl ether sulfate ester salt, and a fatty acid salt.

The amount of the surfactant used is preferably 0.01 to 10.00 parts by mass, more preferably 0.05 to 5.00 parts by mass, and further preferably 0.10 to 2.50 parts by mass, per 100 parts by mass in total of the ethylenic unsaturated monomers.

The surfactant used may also be a water soluble polymer having nonionicity, cationicity, or anionicity, such as a water soluble (meth)acrylic acid resin and a water soluble (meth)acrylate ester resin. Herein, a molecule that has a structure obtained through polymerization of an ethylenic unsaturated monomer and has water solubility is designated as a water soluble polymer. The water soluble polymer may be used irrespective of the saponification degree, the average polymerization degree, and the presence or absence of modification. The average polymerization degree is preferably 100 to 5,000, more preferably 200 to 4,000, and further preferably 200 to 2,400, from the standpoint of the polymerization stability and the viscosity of the product. The saponification degree is preferably 50% to 100%, more preferably 60% to 100%, and further preferably 80% to 100%, from the standpoint of the polymerization stability.

In the case where the surfactant used is the water soluble polymer, the amount thereof used is not particularly limited, and is preferably 1 to 100 parts by mass, and more preferably 10 to 30 parts by mass, per 100 parts by mass in total of the ethylenic unsaturated monomers, from the standpoint of the polymerization stability.

The surfactant ($a_1 2$) preferably contains an anionic surfactant, and more preferably contains a compound represented by the following general formula (1):

$$RO-(CH_2CH_2O)_n-SO_3M \quad (1)$$

wherein R represents a hydrocarbon skeleton containing at least one kind selected from the group consisting of a saturated or unsaturated aliphatic skeleton having an average number of carbon atoms of 5 to 20, a saturated or unsaturated alicyclic skeleton having an average number of carbon atoms of 5 to 20, and an aromatic skeleton having an average number of a ring structure of 1 to 10; M represents sodium or ammonium; and n (average value) is 2 to 60. n (average value) is preferably 2 to 30, and R preferably represents a hydrocarbon skeleton containing at least one kind selected from the group consisting of a saturated or unsaturated aliphatic skeleton having an average number of carbon atoms of 8 to 18 and an aromatic skeleton having an average number of a ring structure of 1 to 5. Specific examples thereof include polyoxyethylene oleyl cetyl ether ammonium sulfate, polyoxyethylene nonyl phenyl ether sodium sulfate, and polyoxyethylene styrenated phenyl ether ammonium sulfate. A surfactant, in which M is ammonium, is more preferred. The surfactant ($a_1 2$) may be added and mixed after the production of the latex.

1-3. Aqueous Medium

The polymer ($a_1 1$) of the embodiment exists in the form of the latex ($A_1$). The dispersion medium is an aqueous medium containing water as an essential component. The aqueous medium may contain a hydrophilic solvent in addition to water.

It suffices that the hydrophilic solvent is a water soluble solvent that functions as a medium for dispersing the polymer ($a_1 1$) with no particular limitation. As the hydrophilic solvent, an alcohol, such as methyl alcohol, ethyl alcohol, n-propyl alcohol, isopropyl alcohol, t-butyl alcohol, and benzyl alcohol, and a nitrogen-containing organic solvent, such as N-methylpyrrolidone, may be used alone or as a combination of two or more kinds thereof.

The content of the hydrophilic solvent in the aqueous medium is preferably 10% by mass or less, and more preferably 5% by mass or less. In the case where the latex ($A_1$) is used as an adhesive, the aqueous medium is preferably formed only of water.

The content of the aqueous medium is preferably such a range that provides a solid concentration of the latex ($A_1$) of 10 to 70% by mass, more preferably such a range that provides a solid concentration thereof of 15 to 65% by mass, and further preferably such a range that provides a solid concentration thereof of 20 to 60% by mass. In the case where the solid concentration of the latex ($A_1$) is 70% by mass or less, the storage stability can be enhanced. In the case where the solid concentration of the latex ($A_1$) is 10% by mass or more, the latex can be processed corresponding to the purpose, and may be practically useful.

2. Embodiment 2 of Latex for Adhesive Composition (A)

Another embodiment (embodiment 2) of the latex for an adhesive composition ($A_2$) will be described below, in which the description of the contents that are common to the embodiment 1 will be omitted.

The latex for an adhesive composition ($A_2$) according to the embodiment 2 contains a polymer of an ethylenic unsaturated monomer ($a_2 1$), a surfactant ($a_2 2$), and an aqueous medium, and the polymer of an ethylenic unsaturated monomer ($a_2 1$) has a carboxy group and a crosslinked structure.

The polymer of an ethylenic unsaturated monomer ($a_2 1$) has a carboxy group and a crosslinked structure, and thereby in the use of the adhesive composition of the present invention containing the latex ($A_2$) and the chloroprene based polymer latex (B) mixed with each other, the carboxy group accelerates gelation of the chloroprene based polymer latex, so as to exhibit the excellent initial adhesion force and contact property.

It has been known that in decreasing the pH, the gelation of the chloroprene based polymer latex (B) is accelerated, and then the crystallization of the chloroprene based polymer occurs to exhibit the initial adhesion force. In the case where the latex ($A_2$) has a carboxy group, which is a weak acid, the adhesive composition containing the latex ($A_2$) and the chloroprene based polymer latex (B) mixed with each other has good storage stability without gelation in the storage thereof.

In the use of the adhesive composition of the present invention, on the other hand, the dispersion medium containing water is removed to lower the pH in the system, and thereby the gelation of the chloroprene based polymer rapidly proceeds to exhibit the adhesion force.

The molar number of the carboxy group contained in 1 kg of the solid content of the latex ($A_2$) is preferably 0.01 to 1.00 mol, more preferably 0.05 to 0.50 mol, and further preferably 0.10 to 0.40 mol. In the case where the molar number of the carboxy group contained in 1 kg of the solid content of the latex ($A_2$) is 0.01 mol or more, the excellent initial adhesion force and contact property can be exhibited in mixing with the chloroprene based polymer latex (B) (described later), and in the case where the molar number of the carboxy group contained in 1 kg of the solid content of the latex for an adhesive composition ($A_2$) is 1.00 mol or less, the storage stability in mixing with the chloroprene based polymer latex (B) can be enhanced.

2-1. Polymer of Ethylenic Unsaturated Monomer ($a_2 1$)

The structural unit constituting the polymer of an ethylenic unsaturated monomer ($a_2 1$) is not particularly limited, as far as it is a monomer that has an ethylenic unsaturated bond. Examples of the monomer having an ethylenic unsaturated bond include (meth)acrylic acid, fumaric acid, maleic acid, and esters thereof; (meth)acrylamide and a derivative thereof, styrene and a derivative thereof; a vinyl ester; an N-substituted maleimide compound; and itaconic acid, crotonic acid, phthalic acid, and esters thereof and metal salts and ammonium salts thereof. The monomers having an ethylenic unsaturated bond may be used alone or as a combination of two or more kinds thereof.

2-1-1. Ethylenic Unsaturated Monomer Having Carboxy Group

For introducing a carboxy group to the polymer of an ethylenic unsaturated monomer ($a_2 1$), an ethylenic unsaturated monomer having a carboxy group is preferably used as a monomer. Examples of the ethylenic unsaturated monomer having a carboxy group used are the same as in the embodiment 1. In the embodiment 2, the monomer used for the polymer of an ethylenic unsaturated monomer ($a_2 1$) is preferably an ethylenic unsaturated monomer having two or more carboxy groups in the molecule, and an ethylenic unsaturated monomer having three or more carboxy groups, such as aconitic acid, may also be used.

The total amount of the structural unit derived from the ethylenic unsaturated monomer having a carboxy group is preferably 0.5 to 5.0% by mass, and more preferably 1.0 to 4.0% by mass, based on the total amount of all the structural units derived from the ethylenic unsaturated monomers constituting the polymer ($a_2 1$). The reason therefor has been described for the embodiment 1. It is more preferred that the ethylenic unsaturated monomer having two or more carboxy groups in the molecule is contained in an amount of 1.0 to 4.0% by mass based on the total amount of all the structural units derived from the ethylenic unsaturated monomers constituting the polymer ($a_2 1$).

2-1-2. Crosslinkable Ethylenic Unsaturated Monomer

The polymer of an ethylenic unsaturated monomer ($a_2 1$) has a crosslinked structure, and thereby the strength of the adhesive after gelation is increased to exhibit the excellent initial adhesion force and contact property. For introducing the crosslinked structure to the polymer ($a_2 1$), a crosslinkable ethylenic unsaturated monomer is preferably used as a monomer.

The crosslinkable ethylenic unsaturated monomer is a compound that has plural ethylenic unsaturated bonds performing reaction between the crosslinkable ethylenic unsaturated monomers, or a compound that has a functional group reacting with a carboxy group and an ethylenic unsaturated bond. Examples of the compound having a functional group reacting with a carboxy group include an ethylenic unsaturated monomer having an epoxy group, such as glycidyl (meth)acrylate, methylglycidyl (meth)acrylate, and 3,4-epoxycyclohexyl (meth)acrylate. Examples of the compound performing reaction between the crosslinkable ethylenic unsaturated monomers include a silane coupling agent having an ethylenic unsaturated group, such as vinyltrimethoxysilane, vinyltriethoxysilane, N-(2-(vinylbenzylamino)ethyl)-3-aminopropyltrimethoxysilane hydrochloride, 3-methacryloxypropyltrimethoxysilane, 3-methacryloxypropylmethyldimethoxysilane, and 3-methacryloxypropyltriethoxysilane, and a monomer having two or more ethylenic unsaturated groups, such as ethanediol di(meth)acrylate, propanediol di(meth)acrylate, butanediol di(meth)acrylate, hexanediol di(meth)acrylate, dimethyloltricyclodecane di(meth)acrylate, ethylene glycol di(meth)acrylate, diethylene glycol di(meth)acrylate, dipropylene glycol di(meth)acrylate, trimethylolpropane tri (meth)acrylate, phenoxypolyethylene glycol (meth)acrylate, pentaerythritol tetra(meth)acrylate, and divinylbenzene. Among these, as the crosslinkable ethylenic unsaturated monomer, at least one kind selected from the group consisting of an ethylenic unsaturated monomer having an epoxy group, a silane coupling agent having an ethylenic unsaturated group, and a monomer having two or more ethylenic unsaturated groups is more preferably contained.

The content of the structural unit derived from the crosslinkable ethylenic unsaturated monomer is preferably 0.01% by mass or more, and more preferably 0.10% by mass or more, based on the total amount of all the structural units derived from the ethylenic unsaturated monomers constituting the polymer ($a_2 1$) since the strength after gelation of the adhesive composition containing the chloroprene based polymer latex (B) described later mixed therewith can be increased to enhance the contact property.

The content of the structural unit derived from the crosslinkable ethylenic unsaturated monomer is preferably 5.00% by mass or less, and more preferably 3.00% by mass or less, based on the total amount of all the structural units derived from the ethylenic unsaturated monomers constituting the polymer ($a_2 1$) since the storage stability of the adhesive composition containing the chloroprene based polymer latex (B) mixed therewith can be enhanced.

2-1-3. Ethylenic Unsaturated Monomer Having Hydroxy Group

The monomer constituting the polymer (a1) may contain and preferably contains an ethylenic unsaturated monomer having a hydroxy group, in addition to the ethylenic unsaturated monomer having a carboxy group and the crosslinkable ethylenic unsaturated monomer. A monomer that has a hydrophilic functional group other than a hydroxy group is not encompassed in the "ethylenic unsaturated monomer having a hydroxy group", but is designated as the "surfactant having an ethylenic unsaturated bond".

Examples of the ethylenic unsaturated monomer having a hydroxy group include hydroxyethyl (meth)acrylate, hydroxypropyl (meth)acrylate, hydroxybutyl (meth)acrylate, ethylene glycol mono(meth)acrylate, polyethylene glycol mono(meth)acrylate, polypropylene glycol mono(meth)acrylate, polytetramethylene glycol mono(meth)acrylate, polyethylene glycol polytetramethylene glycol mono(meth)acrylate, and polypropylene glycol polytetramethylene glycol mono(meth)acrylate. The ethylenic unsaturated monomers having a hydroxy group may be used alone or as a combination of two or more kinds thereof.

The content of the ethylenic unsaturated monomer having a hydroxy group is preferably 0.1% by mass or more, and more preferably 1.0% by mass or more, based on the total amount of all the structural units derived from the ethylenic unsaturated monomers constituting the polymer ($a_2 1$) since the progress rate of the gelation of the adhesive composition containing the chloroprene based polymer latex (B) described later mixed therein can be increased to enhance the contact property.

The content of the ethylenic unsaturated monomer having a hydroxy group is preferably 20.0% by mass or less, and more preferably 15.0% by mass or less, based on the total amount of all the structural units derived from the ethylenic unsaturated monomers constituting the polymer ($a_2$1) since the storage stability of the adhesive composition containing the chloroprene based polymer latex (B) mixed therewith can be increased.

2-1-4. Hydrophobic Ethylenic Unsaturated Monomer

The monomer constituting the polymer ($a_2$1) may contain and preferably contains a hydrophobic ethylenic unsaturated monomer, in addition to the ethylenic unsaturated monomer having a carboxy group, the crosslinkable ethylenic unsaturated monomer, and the ethylenic unsaturated monomer having a hydroxy group. The hydrophobic ethylenic unsaturated monomer has been described for the embodiment 1.

In the total ethylenic unsaturated monomers constituting the acrylic acid polymer ($a_2$1), the hydrophobic ethylenic unsaturated monomer is preferably contained in an amount of 50.0 to 99.4% by mass, and more preferably 50.0 to 98.0% by mass. In the case where the amount of the hydrophobic ethylenic unsaturated monomer is 50.0% by mass or more in the total ethylenic unsaturated monomers, the storage stability of the adhesive composition containing the chloroprene based polymer latex (B) described later mixed therein can be enhanced. In the case where the amount of the hydrophobic ethylenic unsaturated monomer is 99.4% by mass or less in the total ethylenic unsaturated monomers, the progress rate of the gelation of the adhesive composition containing the chloroprene based polymer latex (B) mixed therein can be increased to enhance the contact property.

2-1-5. Surfactant Having Ethylenic Unsaturated Bond

The polymer of an ethylenic unsaturated monomer ($a_2$1) preferably contains a structural unit derived from a surfactant having an ethylenic unsaturated bond since the dispersion stability of the particles can be enhanced. The ethylenic unsaturated monomer having a carboxy group is not encompassed in the surfactant having an ethylenic unsaturated bond. Examples of the surfactant having an ethylenic unsaturated bond include compounds represented by the chemical formula (2) to (5) described for the embodiment 1.

2-1-6. Additional Ethylenic Unsaturated Monomer

The ethylenic unsaturated monomer in the embodiment may contain an ethylenic unsaturated monomer other than the ethylenic unsaturated monomer having a carboxy group, the hydrophobic ethylenic unsaturated monomer, the crosslinkable ethylenic unsaturated monomer, and the ethylenic unsaturated monomer having a hydroxy group. Specific examples thereof include methoxyethyl (meth)acrylate, butoxyethyl (meth)acrylate, dimethylaminoethyl (meth) acrylate, diethylaminoethyl (meth)acrylate, phenoxypolyethylene glycol (meth)acrylate, methoxyethyl (meth)acrylate, butoxyethyl (meth)acrylate, dimethylaminoethyl (meth)acrylate, diethylaminoethyl (meth)acrylate, dimethyl fumarate, diethyl fumarate, dibutyl fumarate, dimethyl maleate, diethyl maleate, dibutyl maleate, methacrylamide, N-methyl(meth)acrylamide, N-ethyl (meth)acrylamide, N-butyl(meth)acrylamide, N-propyl(meth)acrylamide, methyl vinylbenzoate, vinylbenzyl acetate, vinyl acetate, vinyl propionate, vinyl capronate, methyl maleimide, ethyl maleimide, isopropyl maleimide, dimethyl itaconate, diethyl itaconate, dibutyl itaconate, methyl crotonate, ethyl crotonate, butyl crotonate, dimethyl phthalate, diethyl phthalate, dipropyl phthalate, and dibutyl phthalate. These compounds may be used alone or as a combination of two or more kinds thereof.

[Average Particle Diameter of Polymer ($a_2$1)]

The average particle diameter of the polymer ($a_2$1) in the latex ($A_2$) is preferably 0.30 to 5.00 μm, more preferably 0.50 to 3.00 μm, and further preferably 0.60 to 2.00 μm. The method for controlling the average particle diameter to the aforementioned range, the reason for the aforementioned average particle diameter, and the definition of the average particle diameter have been described for the polymer ($a_1$1) of the embodiment 1.

2-2. Surfactant ($a_2$2) and Aqueous Medium

The surfactant ($a_2$2) and the aqueous medium have been described for the surfactant ($a_1$2) of the embodiment 1.

3. Production Method of Latex for Adhesive Composition (A)

The latex for an adhesive composition (A) of the present invention may be produced by a known polymerization method, such as a suspension polymerization method, an emulsion polymerization method, a solution polymerization method, and a bulk polymerization method, by using the ethylenic unsaturated monomer for synthesizing the polymer (a1), the surfactant (a2), and the aqueous medium. The latex may be produced by any of a continuous polymerization method and a batch polymerization method. Among these, the production by a suspension polymerization method or an emulsion polymerization method is preferred, and the production by an emulsion polymerization method is more preferred, from the standpoint of the uniformity of the particle diameter.

The method for emulsion polymerization may be a method of charging and polymerizing the aforementioned components at one time, or a method of polymerizing the components while continuously feeding the components. Examples of the method of polymerizing the components while continuously feeding the components include a method of continuously feeding under agitation of a mixed emulsified liquid obtained by mixing and emulsifying the ethylenic unsaturated monomer, the aqueous medium, and the surfactant in a polymerization initiator solution obtained by mixing a part of the polymerization initiator, the aqueous medium, and the surfactant, and the balance of the polymerization initiator.

In the emulsion polymerization performed, a polymerization initiator is preferably used. The polymerization initiator used may be a known commonly used one, such as a persulfate salt, such as potassium persulfate and ammonium persulfate, hydrogen peroxide, an azo compound, and an organic peroxide. A redox initiator using the polymerization initiator and a reducing agent in combination may also be used. The amount of the polymerization initiator used is preferably 0.01 to 1 part by mass, more preferably 0.05 to 0.8 part by mass, and further preferably 0.1 to 0.5 parts by mass, per 100 parts by mass in total of the ethylenic unsaturated monomers, for achieving an appropriate polymerization rate.

The temperature in the emulsion polymerization performed may vary depending on the kind of the polymerization initiator, and may be, for example, 30 to 85° C.

In providing the polymer (a1), for controlling the molecular weight thereof, a chain transfer agent, such as mercaptan, thioglycolic acid or an ester thereof, and a β-mercaptopropionic acid or an ester thereof, may be used.

4. pH of Latex for Adhesive Composition (A)

After providing the polymer (a1), the pH thereof can be and is preferably controlled. At this time, the neutralization degree of the latex (A) is preferably 0.3 or more, and more preferably 0.5 or more. The neutralization degree of the latex (A) is preferably 0.7 to 1.3, more preferably 0.8 to 1.2, and further preferably 0.9 to 1.1. The neutralization degree of the latex (A) means the ratio of the amount of the basic compound added, with respect to the amount of the basic compound necessary for neutralizing the carboxy group and other acid components contained in the latex (A).

In the case where the neutralization degree of the latex (A) is 0.3 or more, the storage stability of the adhesive composition containing the latex (A) and the chloroprene based polymer latex (B) mixed with each other can be enhanced. In the case where the neutralization degree of the latex is 1.3 or less, the progress of gelation of the adhesive composition containing the latex (A) and the chloroprene based polymer latex (B) mixed with each other can be increased to provide the sufficient contact property.

The pH at 25° C. of the latex (A) is preferably 6.0 to 10.0, more preferably 6.5 to 9.5, and further preferably 7.0 to 9.5. In the case where the pH is 6 or more, the storage stability of the adhesive composition containing the latex (A) and the chloroprene based polymer latex (B) mixed with each other can be enhanced, and in the case where the pH is 10 or less, the progress of gelation of the adhesive composition containing the latex (A) and the chloroprene based polymer latex (B) mixed with each other can be increased to provide the sufficient contact property.

The basic compound added for the neutralization is not particularly limited, and examples thereof include sodium hydroxide, potassium hydroxide, and aqueous ammonia. The addition of aqueous ammonia is particularly preferred from the standpoint of the storage stability.

5. Formaldehyde Emission of Latex for Adhesive Composition (A)

The latex (A) of the present invention preferably has a formaldehyde emission of 0.05 mg/L or less measured for a test piece produced according to JIS A1902-2 by the glass desiccator method according to JIS A1460. The method for controlling the formaldehyde content to the range is not particularly limited, and for example, the formaldehyde content can be achieved by preventing the use of formaldehyde and materials derived from formaldehyde, as the raw materials of the adhesive composition.

6. Chloroprene Based Polymer Latex (B)

The chloroprene based polymer latex (B) of the present invention is a latex containing a chloroprene based polymer dispersed as fine particles in an aqueous medium.

The chloroprene based polymer constituting the chloroprene based polymer latex (B) is a homopolymer of chloroprene or a copolymer of chloroprene and a monomer capable of being copolymerized with chloroprene. In other words, the chloroprene based polymer is a polymer containing a structural unit derived from chloroprene. Examples of the copolymerizable monomer include 2,3-dichloro-1,3-butadiene, 1-chloro-1,3-butadiene, butadiene, isoprene, styrene, acrylonitrile, acrylic acid and an ester thereof, and methacrylic acid and an ester thereof. The structural unit derived from the copolymerizable monomer may be contained in the chloroprene based polymer in such a range that does not impair the target capabilities of the present invention. In the chloroprene based polymer, the content of the structural unit derived from chloroprene may be 80% by mol or more.

A copolymer containing specifically as the copolymerizable monomer 2,3-dichloro-1,3-butadiene, 1-chloro-1,3-butadiene, butadiene, isoprene, styrene, acrylonitrile, an acrylate ester, or a methacrylate ester in an amount in a range of 0.01 to 20% by mass, or acrylic acid or methacrylic acid in an amount in a range of 0.01 to 7% by mass may be used. The monomers constituting the copolymer may be two or more kinds. Two or more kinds of the polymers may be used as a mixture. In the case where the copolymerizable monomer is used in combination with chloroprene, the content of the monomer unit derived from the copolymerizable monomer in the copolymer may be 20% by mol or less, and thereby the adhesive composition can have the good contact property and initial adhesion strength.

The surfactant of the chloroprene based polymer latex (B) is not particularly limited, and those exemplified for (a2) may be used. Among these, an anionic surfactant is preferred. In particular, an anionic surfactant having a carboxy group is more preferred since the excellent initial adhesion force and contact property can be exhibited in mixing with the latex (A). In particular, a surfactant that becomes insoluble in the case where the pH is lowered to a certain level or less is preferred, and a surfactant that is stabilized with an alkali salt of a rosin acid containing abietic acid as the major component is more preferred. The anionic surfactant having a carboxy group may be introduced as an emulsifier in the polymerization of the chloroprene based polymer latex, or may be added as an additive after the polymerization.

The amount of the surfactant contained in the chloroprene based polymer latex (B) is preferably 1 to 8% by mass, and more preferably 2 to 5% by mass, based on the solid content of the chloroprene based polymer latex (B). In the case where the content of the surfactant is 1% by mass or more based on the solid content of the chloroprene based polymer latex (B), the sufficient stability can be obtained in the polymerization and storage. In the case where the content thereof is 8% by mass or less, the adhesive composition can have the good contact property and initial adhesion force.

7. Mixing Ratio of Latex for an Adhesive Composition (A) and Chloroprene Based Polymer Latex (B)

In the adhesive composition of the present invention, the mixing ratio by mass of the latex (A) and the chloroprene based polymer latex (B) is preferably 1/99 to 99/1, more preferably 10/90 to 90/10, and further preferably 25/75 to 70/30, in terms of solid content ratio. Since the initial adhesion strength and contact property of the adhesive composition of the present invention is derived from the crystallization of the chloroprene based polymer, in the case where the solid content ratio is 1/99 or more, the initial adhesion strength and contact property can be exhibited, and in the case where the solid content ratio is 99/1 or less, the progress of gelation of the adhesive composition can be increased to provide the sufficient contact property.

The mixing method of the latex (A) and the chloroprene based polymer latex (B) is not particularly limited, and examples thereof include manual mixing, a rotary gear agitator, such as Disper, and a homogenizer, such as a high-pressure type, an ultrasonic type, and a high-speed rotation type. In any of these methods, an excessive shearing force is preferably prevented from being applied from the standpoint of the suppression of aggregates in mixing.

The pH of the adhesive composition of the present invention is preferably in a range of 5.0 to 12.0, more preferably 6.0 to 11.0, and further preferably 7.0 to 10.0. In the case where the pH of the adhesive composition is 5.0 or more, the storage stability of the adhesive composition can be enhanced, and the pH thereof is 12.0 or less, the progress of gelation of the adhesive composition can be increased to provide the sufficient contact property.

8. Additives

The adhesive composition of the present invention may arbitrarily contain the additives described later, in addition to the latex (A) and the chloroprene based polymer latex (B). The additives may be added in mixing the latex (A) and the latex (B). It is also possible that the additives are added to the latex (A) and/or the latex (B) in advance in such a range that does not impair the effects of the present invention, and then the adhesive composition is produced.

8-1. pH Modifier

The adhesive composition of the present invention may be controlled to have preferred pH by using a pH modifier. Examples of the pH modifier used include an acidic substance, such as ordinary inorganic acids and organic acids, a salt thereof, and an amphoteric salt, such as an amino acid, and also include various kinds of latexes having pH of 10 or less.

Examples of the organic acid for the pH modifier include acetic acid, formic acid, glycolic acid, malic acid, citric acid, maleic acid, fumaric acid, malonic acid, phthalic acid, isophthalic acid, lactic acid, butyric acid, ascorbic acid, succinic acid, tartaric acid, acrylic acid, methacrylic acid, crotonic acid, adipic acid, oxalic acid, and abietic acid. Examples of the inorganic acid therefor include boric acid, phosphoric acid, hydrochloric acid, nitric acid, nitrous acid, sulfuric acid, and sulfurous acid. Examples thereof also include salts of an organic acid or an inorganic acid with sodium, potassium, ammonia, aminoethanol, diethanolamine, or triethanolamine.

Examples of the amino acid therefor include glycine, glycylglycine, asparagine, aspartic acid, alanine, phenylalanine, arginine, glutamine, and glutamic acid. Examples of the latex having pH of 10 or less include a copolymer latex of an acrylate ester or a methacrylate ester, a carboxy modified synthetic rubber latex, such as a styrene-butadiene copolymer copolymerized with acrylic acid, methacrylic acid, or the like, and chloroprene copolymerized with acrylic acid, methacrylic acid, or the like, in addition to the latex (A), but are not limited thereto.

The pH modifiers may be used alone or as a combination of two or more kinds thereof. An amino acid, such as glycine, alanine, phenylalanine, and glutamic acid, and an organic acid, such as malonic acid, are preferred from the standpoint of the initial adhesiveness, the contact property, and the storage stability of the adhesive composition.

8-2. Tackifier Resin

The adhesive composition of the present invention may contain a tackifier resin. Specific examples thereof include a rosin resin, a rosin ester resin, a hydrogenated rosin resin, a polymerized rosin resin, an α-pinene resin, a β-pinene resin, a terpene phenol resin, a C5-fraction petroleum resin, a C9-fraction petroleum resin, a C5/C9-fraction petroleum resin, a dicyclopentadiene petroleum resin, an alkylphenol resin, a xylene resin, a coumarone resin, and a coumarone-indene resin. The tackifier resins may be used alone or as a combination of two or more kinds thereof. The addition method of the tackifier resin is preferably a method of adding after converting to a latex, for dispersing the resin homogeneously in the adhesive composition.

8-3. Plasticizer

The adhesive composition of the present invention may contain a plasticizer. In particular, a dibasic acid ester plasticizer is preferred. Specific examples of the dibasic acid ester plasticizer include a dialkyl phthalate ester, a dialkyl adipate ester, and a dialkyl sebacate ester. The content of the dibasic acid ester plasticizer is preferably 10 parts by mass or less based on the total solid content of the latex (A) and the latex (B).

8-4. Antioxidant

The adhesive composition of the present invention may contain an antioxidant. Examples of the antioxidant include a hindered phenol antioxidant. Specific examples thereof include 2,2'-methylenebis(4-ethyl-6-tert-butylphenol), 2,2'-methylenebis(4-methyl-6-tert-butylphenol), 4,4'-butylidenebis(3-methyl-6-tert-butylphenol), and a butylation reaction product of p-cresol and dicyclopentadiene. The amount of the antioxidant added is preferably 0.1 to 3 parts by mass, and more preferably 0.5 to 2 parts by mass, per 100 parts by mass of the solid content of the latex (A) and the latex (B). In the case where the amount of the antioxidant added is 0.1 part by mass or more, the sufficient antioxidation effect can be obtained, and in the case where the amount thereof is 3 parts by mass or less, the sufficient initial adhesion force and contact property can be obtained.

8.5. Additional Additives

In the adhesive composition of the present invention, a filler, a pigment, a colorant, a wetting agent, an anti-foaming agent, a thickener, and the like may be appropriately used as additives other than above in such a range that does not impair the effects of the present invention.

Another resin based latex may be auxiliarily mixed in the adhesive composition in an amount up to 10% by mass (in terms of solid content) thereof. Specific examples thereof include a latex of a polymer of a monomer selected from the group consisting of the examples of the ethylenic unsaturated monomers constituting the polymer (a1).

9. Method for Using Adhesive Composition

The coating method for the adhesive composition of the present invention is not particularly limited, and examples thereof include a dipping method, a brush coating method, a spraying method, and a drawing coating method. The use conditions including the coating amount, the drying time, and the like are also not particularly limited, and for example, the adhesive composition may be coated on an adherend under conditions of a coating amount of 10 to 500 g/m$^2$ and allowed to stand at 5 to 40° C. for 1 minutes to 1 hour, and then the adherend may be adhered to another adherend, followed by pressing with both hands for 1 to 30 seconds, resulting in the sufficient initial adhesion force and contact property. In alternative, in this process, immediately after coating the adhesive composition on the adherend, another adherend may be adhered thereto.

The adhesive composition of the present invention can be favorably used for a one-component aqueous adhesive. In particular, the adhesive composition is useful for the case where at least one of the two adherends to be adhered is a porous member or a water-absorbing member. Examples of the porous member include foam formed of such a material as polyurethane, an ethylene-vinyl acetate copolymer, or polyethylene, and examples of the water-absorbing member include wood, cloth, and fabric. An article including porous members adhered to each other can be used as a cushion material or a building material for the purposes of furniture, automobile interior, and building.

EXAMPLES

The present invention will be described specifically with reference to examples below, but the present invention is not limited to the example.

[Measurement Methods]

<pH>

The pH was measured at 25° C. with "HM-30G", produced by DKK-TOA Corporation.

<Average Particle Diameter>

The average particle diameter was measured by the laser diffraction dynamic light scattering method with "Nanotrac (Registered trademark) Wave II", produced by Microtrac-BEL Corporation, and the value at a cumulative frequency of 50% was designated as the average particle diameter.

<Formaldehyde Emission>

According to JIS A1902-2, 13.5 g of the latex (A) was coated on a glass plate of 15 cm×30 cm and aged at 23° C. for 24 hours to produce a test piece. The test piece was measured by the glass desiccator method according to JIS A1460.

<Contact Property>

The adhesive composition was coated on one surface of a polyurethane foam cube having an edge length of 5 cm with a spray gun, W-101-131G, produced by Anest Iwata Corporation, under conditions of a spraying air pressure of 0.4 MPa, a latex spraying amount of 120 mL/min, a spraying distance of 30 cm, and a coating amount of 100 g/m², and allowed to stand at 25° C. for 1 minute. The coated surface was pinched with fingers with the center line of the coated surface as a folding line, so as to adhere the coated surfaces to each other for 5 seconds, and then visually observed as to whether or not the polyurethane foam was peeled off to return to the original shape even after the fingers were released. In the case where the polyurethane foam was peeled off, the operation of pinching the coated surface with fingers with the center line of the coated surface as a folding line for 5 seconds was immediately repeated, and the number of times of adhesion until the polyurethane foam was not peeled off was evaluated. A smaller number of times is considered to be good contact property. Five specimens were evaluated, and the average value thereof was designated as the evaluation value of contact property.

<Initial Adhesion Force>

Two pieces of polyurethane foam substrates of a 5 cm square with a thickness of 2.5 cm were prepared, the adhesive composition was coated on one surface of each of the substrates with a spray gun, W-101-131G, produced by Anest Iwata Corporation, under conditions of a spraying air pressure of 0.4 MPa, a latex spraying amount of 120 mL/min, a spraying distance of 30 cm, and a coating amount of 100 g/m², and allowed to stand at 25° C. for 1 minute. Thereafter, the substrates were adhered at the adhesion surfaces of 2.5 cm×5 cm and pressed with both hands for 5 seconds. After allowing to stand for 30 seconds or 2 minutes after pressing, both ends of the test piece were held with the chucks of Autograph (Registered trademark) AG-X (produced by Shimadzu Corporation), and the adhesion force was measured by pulling the test pieces at a tensile speed of 200 mm/min in an environment of 23° C. and 50% RH.

<Storage Stability>

The adhesive composition was sealed in a glass bottle and allowed to stand at 70° C. for 7 days, and the storage stability was evaluated by measuring the viscosities before and after allowing to stand. The viscosity was measured at 23° C. with a BL type viscometer with a rotor No. 19 at a rotation number of 60 rpm.

[Production of Latex (A)]

Synthesis Example 1

12.4 g of methacrylic acid, 84.6 g of methyl methacrylate, 384.6 g of 2-ethylhexyl acrylate, 8.7 g of 2-hydroxyethyl acrylate, 0.9 g of glycidyl methacrylate, 1.78 g of Hitenol 08E, 4.2 g of Eleminol JS-20, and 130 g of ion exchanged water were homogeneously emulsified with a homogenizer to provide a monomer emulsion.

125 g of ion exchanged water, 0.32 g of Hitenol (Registered trademark) 08E (produced by Dai-ichi Kogyo Seiyaku Co., Ltd., polyoxyethylene oleyl cetyl ether ammonium sulfate, solid concentration: 100% by mass), 0.3 g of Eleminol (Registered trademark) JS-20 (produced by Sanyo Chemical Industries, Ltd., sodium alkylaryl sulfosuccinate, solid concentration: 40% by mass), 0.6 g of magnesium nitrate, and 1.7 g of 2-ethylhexyl thioglycolate were placed in a 1 L five-neck separable flask and heated to 80° C. under agitation. 0.25 g of potassium persulfate and a 5% by mass portion of the monomer emulsion were added to the separable flask, and then the balance of the monomer emulsion was started to be added dropwise to initiate the reaction. The monomer emulsion was added to the separable flask over 4 hours, and simultaneously an aqueous solution containing 1.65 g of potassium persulfate dissolved in 60 g of ion exchanged water was also added over 4.5 hours. After completing the addition of the potassium persulfate aqueous solution, the mixture was agitated at 80° C. for 1 hour to complete the reaction. After cooling the content of the separable flask, 9.8 g of 25% by mass aqueous ammonia was added to neutralize the system. Thereafter, 173.1 g of ion exchanged water was added to dilute to make a solid content of 50% by mass, resulting in a latex (A-1). The composition, the average particle diameter, pH, and the formaldehyde emission thereof are shown in Table 1.

Synthesis Examples 2 to 11

Latexes (A-2) to (A-8) and (X-1) to (X-3) were obtained by producing in the same manner as in Synthesis Example 1 except that the compositions shown in Table 1 were used. The composition, the average particle diameter, pH, and the formaldehyde emission thereof are shown in Table 1.

The details of the surfactant components in Table 1 are as follows.

(1) Trax N-200: produced by NOF Corporation, polyoxyethylene nonyl phenyl ether sodium sulfate, aqueous solution having a solid concentration of 26% by mass (2) Hitenol (Registered trademark) NF-13: produced by Dai-ichi Kogyo Seiyaku Co., Ltd., polyoxyethylene styrenated phenyl ether ammonium sulfate, solid content: 100% by mass (3) Adeka Reasoap (Registered trademark) SE-11: produced by Adeka Corporation, ammonium salt of α-sulfo-ω-(1-(nonylphenoxy)methyl-2-(2-propenyloxy)ethoxy)poly(oxy-1,2-ethanediyl), solid content: 100% by mass (4) Emulgen (Registered trademark) 147: produced by Kao Corporation, polyoxyethylene lauryl ether, solid content: 100% by mass (5) Eleminol (Registered trademark) RS-3000: produced by Sanyo Chemical Industries, Ltd., methacryloyloxypolyoxypropylene sodium sulfate, aqueous solution having a solid concentration of 50% by mass
(6) Hitenol (Registered trademark) 08E: produced by Dai-ichi Kogyo Seiyaku Co., Ltd., polyoxyethylene oleyl cetyl ether ammonium sulfate, solid concentration: 100% by mass
(7) Hitenol (Registered trademark) NF-13: produced by Dai-ichi Kogyo Seiyaku Co., Ltd., polyoxyethylene styrenated phenyl ether ammonium sulfate, solid content: 100% by mass
(8) Eleminol (Registered trademark) JS-20: produced by Sanyo Chemical Industries, Ltd., sodium alkylaryl sulfosuccinate, solid concentration: 40% by mass

[Production of Adhesive Composition]

Example 1

31.8 g of Showprene (Registered trademark) SD130 (homopolymer latex of chloroprene, produced by Showa Denko K.K., containing sodium rosinate and potassium rosinate, surfactant concentration based on solid content: 2% by mass, solid content: 55% by mass) as a latex (B-1), 35 g of the latex (A-1), and 0.3 g of glycine as a pH modifier were mixed to provide a composition 1. The composition and the evaluation results thereof are shown in Tables 2 and 3.

Examples 2 to 15 and Comparative Examples 1 to 6

Compositions 2 to 21 were obtained by producing in the same manner as in Example 1 except that the compositions shown in Tables 2 and 3 were used. The composition and the evaluation results thereof are shown in Tables 2 and 3.

The details of the component in Tables 2 and 3 are as follows.

Showprene (Registered trademark) SD77S: chloroprene based polymer latex, produced by Showa Denko K.K., containing sodium rosinate and potassium rosinate, solid content: 55% by mass, surfactant concentration based on solid content: 2% by mass

TABLE 1

| | | | | Synthesis Example 1 A-1 | Synthesis Example 2 A-2 | Synthesis Example 3 A-3 | Synthesis Example 4 A-4 | Synthesis Example 5 A-5 | Synthesis Example 6 A-6 |
| --- | --- | --- | --- | --- | --- | --- | --- | --- | --- |
| | | | Latex | | | | | | |
| Blend (g) | Ethylenic unsaturated monomer polymer (a1) | Ethylenic unsaturated monomer having carboxy group | Methacrylic acid | 12.4 | 12.4 | | | | |
| | | | Itaconic acid | | | 9.4 | 9.4 | 9.4 | 4.9 |
| | | Additional ethylenic unsaturated monomer | Styrene | | | | | 85.1 | 227.2 |
| | | | Methyl methacrylate | 84.6 | 84.6 | 85.1 | 85.0 | | |
| | | | Butyl acrylate | | | | | | |
| | | | 2-Ethylhexyl acrylate | 384.8 | 384.7 | 386.9 | 386.3 | 886.9 | 236.0 |
| | | | Vinyl acetate | | | | | | |
| | | | 2-Hydroxyethyl acrylate | 8.7 | 8.7 | 8.8 | 8.8 | 8.8 | |
| | | | 2-Hydroxyethyl methacrylate | | | | | | 5.0 |
| | | | Glycidyl methacrylate | 0.9 | 0.9 | 0.9 | 0.9 | 0.9 | |
| | | | Acrylamide | | | | | | 17.1 |
| | | Surfactant | Hitenol 08E | 2.1 | 2.1 | 2.1 | 2.1 | 2.1 | 4.2 |
| | | | Trax N-200 | | | | | | |
| | | | Hitenol NF-13 | | | | | | |
| | | | Adeka Reasoap SE-11 | | | | | | |
| | | | Eleminol JS-20 | 4.5 | 4.5 | 4.6 | 4.6 | 4.6 | |
| | | | Eleminol RS-3000 | | | | | | |
| | | | Emulgen 147 | | | | | | 2.4 |
| | Others | Divalent or higher salt | Magnesium nitrate | 0.6 | 0.9 | 0.9 | 1.8 | 0.9 | 0.9 |
| | | Chain transfer agent | 2-Ethylhexyl thioglycolate | 1.7 | 1.7 | 1.8 | 1.8 | 1.8 | |
| | | | N-dodecylmercaptan | | | | | | |
| | | Polymerization initiator | Potassium persulfate | 1.9 | 1.9 | 1.9 | 1.9 | 1.9 | 1.8 |
| | | | Ammonium persulfate | | | | | | |
| | | Reducing agent | Anhydrous sodium bisulfite | | | | | | 0.9 |
| | | Alkali for neutralization | 25% by mass aqueous ammonia | 9.8 | 9.8 | 9.8 | 9.8 | 9.8 | 5.1 |
| Composition ratio, etc. | | | Solid content (non-volatile content) (% by mass) | 50.0 | 50.0 | 50.0 | 50.0 | 50.0 | 50.0 |
| | | | Ethylenic unsaturated monomer having carboxy group in total monomers (% by mass) | 2.5 | 2.5 | 1.9 | 1.9 | 1.9 | 1.0 |
| | | | Sufactant per 100 parts by mass of total monomers (parts by mass) | 0.8 | 0.8 | 0.8 | 0.8 | 0.8 | 0.9 |
| | | | (A) Number of carboxy group contained in 1 kg of solid content (mol) | 0.29 | 0.29 | 0.29 | 0.29 | 0.29 | 0.15 |
| Results | | | Average particle diameter (μm) | 0.34 | 0.55 | 0.55 | 0.68 | 0.57 | 0.36 |
| | | | Neutralization degree | 1.0 | 1.0 | 1.0 | 1.0 | 1.0 | 1.0 |
| | | | pH | 9.4 | 9.3 | 8.5 | 8.5 | 7.9 | 9.0 |
| | | | Formaldehyde emission (mg/L) | 0.01 | 0.01 | 0.01 | 0.01 | 0.01 | 0.01 |

TABLE 1-continued

| | | | Synthesis Example 7<br>A-7 | Synthesis Example 8<br>A-8 | Synthesis Example 9<br>X-1 | Synthesis Example 10<br>X-2 | Synthesis Example 11<br>X-3 |
|---|---|---|---|---|---|---|---|
| | | Latex | | | | | |
| Blend (g) | Ethylenic unsaturated monomer polymer (a1) | Ethylenic unsaturated monomer having carboxy group | | | | | |
| | | Methacrylic acid | 18.5 | | 12.4 | | 18.5 |
| | | Itaconic acid | | 9.4 | | 4.9 | |
| | | | | | | 227.6 | |
| | Additional ethylenic unsaturated monomer | Styrene | 36.0 | 85.0 | 84.8 | | 36.0 |
| | | Methyl methacrylate | 125.0 | | | | 125.2 |
| | | Butyl acrylate | 277.3 | 386.3 | 385.4 | 236.4 | 277.8 |
| | | 2-Ethylhexyl acrylate | 30.4 | | | | 30.5 |
| | | Vinyl acetate | | 8.8 | 8.7 | | |
| | | 2-Hydroxyethyl acrylate | | | | 5.0 | |
| | | 2-Hydroxyethyl methacrylate | | 0.9 | 0.9 | | |
| | | Glycidyl methacrylate | | | | 17.2 | |
| | | Acrylamide | | 2.1 | 4.2 | | |
| | Surfactant | Hitenol 08E | 7.5 | | | | 7.6 |
| | | Trax N-200 | | 2.1 | | | |
| | | Hitenol NF-13 | 1.7 | | | | 1.7 |
| | | Adeka Reasoap SE-11 | | 4.6 | 4.5 | | |
| | | Eleminol JS-20 | 12.8 | | | | 12.8 |
| | | Eleminol RS-3000 | | | | 2.5 | |
| | | Emulgen 147 | 0.8 | 1.8 | | | |
| | Others | Divalent or higher salt | Magnesium nitrate | | 1.8 | 1.7 | | |
| | | Chain transfer agent | 2-Ethylhexyl thioglycolate | 0.2 | | | | 0.2 |
| | | | N-dodecylmercaptan | | 1.9 | 1.9 | 1.8 | |
| | | Polymerization initiator | Potassium persulfate | 1.4 | | | | 1.4 |
| | | | Ammonium persulfate | | | | | |
| | | Reducing agent | Anhydrous sodium bisulfite | 0.4 | | | 0.9 | 0.4 |
| | | Alkali for neutralization | 25% by mass aqueous ammonia | 14.5 | 9.8 | 9.8 | 5.1 | 14.5 |
| Composition ratio, etc. | Solid content (non-volatile content) (% by mass) | | 50.0 | 50.0 | 50.0 | 50.0 | 50.0 |
| | Ethylenic unsaturated monomer having carboxy group in total monomers (% by mass) | | 3.8 | 1.9 | 2.5 | 1.0 | 3.8 |
| | Sufactant per 100 parts by mass of total monomers (parts by mass) | | 2.1 | 0.8 | 0.8 | 0.9 | 2.1 |
| | (A) Number of carboxy group contained in 1 kg of solid content (mol) | | 0.43 | 0.29 | 0.29 | 0.15 | 0.43 |
| Results | Average particle diameter (μm) | | 0.34 | 0.69 | 0.18 | 0.15 | 0.16 |
| | Neutralization degree | | 1.0 | 1.0 | 1.0 | 1.0 | 1.0 |
| | pH | | 9.0 | 8.5 | 9.4 | 9.0 | 9.0 |
| | Formaldehyde emission (mg/L) | | 0.01 | 0.01 | 0.01 | 0.01 | 0.01 |

TABLE 2

| | | | Example 1<br>Composition 1 | Example 2<br>Composition 2 | Example 3<br>Composition 3 | Example 4<br>Composition 4 | Example 5<br>Composition 5 |
|---|---|---|---|---|---|---|---|
| Blend (g) | Latex for adhesive composition (A) | A-1 | 35.0 | 35.0 | | | |
| | | A-2 | | | 35.0 | 35.0 | |
| | | A-3 | | | | | 35.0 |
| | | A-4 | | | | | |
| | | A-5 | | | | | |
| | | A-6 | | | | | |
| | | A-7 | | | | | |
| | | A-8 | | | | | |
| | | X-1 | | | | | |
| | | X-2 | | | | | |
| | | X-3 | | | | | |
| | Chloroprene based polymer latex (B) | SD130 | 31.8 | | 31.8 | | 31.8 |
| | | SD77S | | 31.8 | | 31.8 | |
| | pH modifier | Glycine | 0.3 | 0.3 | 0.3 | 0.3 | 0.3 |
| | Solid content ratio (A)/(B) | | 50/50 | 50/50 | 50/50 | 50/50 | 50/50 |
| Results | Contact property (number of times) | | 2.0 | 2.0 | 1.4 | 2.0 | 1.4 |
| | Initial adhesion force (N/12.5 cm²) | After 30 sec | 7.0 | 6.0 | 10.4 | 9.1 | 17.8 |
| | | After 2 min | 10.6 | 11.0 | 18.2 | 15.6 | 23.6 |
| | Viscosity (mPa · s) | Initial | 860 | 900 | 750 | 750 | 40 |
| | | After storage at 70° C. for 1 week | 900 | 1100 | 800 | 800 | 35 |

TABLE 2-continued

|  |  |  |  |  |  |  |
|---|---|---|---|---|---|---|
| | Viscosity change rate (%) | | 4.7 | 22.2 | 6.7 | 6.7 | −12.5 |

| | | | Example 6 Composition 6 | Example 7 Composition 7 | Example 8 Composition 8 | Example 9 Composition 9 | Example 10 Composition 10 |
|---|---|---|---|---|---|---|---|
| Blend (g) | Latex for adhesive composition (A) | A-1 | | | | | |
| | | A-2 | | | | | |
| | | A-3 | 35.0 | | | | |
| | | A-4 | | 35.0 | 35.0 | | |
| | | A-5 | | | | 35.0 | 35.0 |
| | | A-6 | | | | | |
| | | A-7 | | | | | |
| | | A-8 | | | | | |
| | | X-1 | | | | | |
| | | X-2 | | | | | |
| | | X-3 | | | | | |
| | Chloroprene based polymer latex (B) | SD130 | | 31.8 | | 31.8 | |
| | | SD77S | 31.8 | | 31.8 | | 31.8 |
| | pH modifier | Glycine | 0.3 | 0.3 | 0.3 | 0.3 | 0.3 |
| | Solid content ratio (A)/(B) | | 50/50 | 50/50 | 50/50 | 50/50 | 50/50 |
| Results | Contact property (number of times) | | 1.6 | 1.0 | 1.2 | 1.0 | 1.4 |
| | Initial adhesion force (N/12.5 cm$^2$) | After 30 sec | 15.0 | 25.6 | 18.2 | 18.2 | 14.3 |
| | | After 2 min | 21.2 | 28.5 | 25.0 | 25.0 | 22.2 |
| | Viscosity (mPa · s) | Initial | 40 | 40 | 40 | 40 | 40 |
| | | After storage at 70° C. for 1 week | 38 | 36 | 37 | 37 | 40 |
| | Viscosity change rate (%) | | −5.0 | −10.0 | −7.5 | −7.5 | 0.0 |

TABLE 3

| | | | Example 11 Composition 11 | Example 12 Composition 12 | Example 13 Composition 13 | Example 14 Composition 14 | Example 15 Composition 15 |
|---|---|---|---|---|---|---|---|
| Blend (g) | Latex for adhesive composition (A) | A-1 | | | | | |
| | | A-2 | | | | | |
| | | A-3 | | | | | |
| | | A-4 | | | | 49.0 | 21.0 |
| | | A-5 | | | | | |
| | | A-6 | 35.0 | | | | |
| | | A-7 | | 35.0 | | | |
| | | A-8 | | | 35.0 | | |
| | | X-1 | | | | | |
| | | X-2 | | | | | |
| | | X-3 | | | | | |
| | Chloroprene based polymer latex (B) | SD130 | 31.8 | 31.8 | 31.8 | 19.1 | 44.5 |
| | | SD77S | | | | | |
| | pH modifier | Glycine | 0.3 | 0.3 | 0.3 | 0.3 | 0.3 |
| | Solid content ratio (A)/(B) | | 50/50 | 50/50 | 50/50 | 70/30 | 25/75 |
| Results | Contact property (number of times) | | 2.0 | 2.0 | 1.0 | 2.0 | 1.0 |
| | Initial adhesion force (N/12.5 cm$^2$) | After 30 sec | 9.4 | 8.1 | 27.8 | 14.6 | 30.2 |
| | | After 2 min | 16.2 | 15.1 | 28.3 | 17.2 | 32.1 |
| | Viscosity (mPa · s) | Initial | 100 | 800 | 41 | 40 | 45 |
| | | After storage at 70° C. for 1 week | 120 | 900 | 37 | 30 | 42 |
| | Viscosity change rate (%) | | 20.0 | 12.5 | −9.8 | −25.0 | −6.7 |

| | | | Comparative Example 1 Composition 16 | Comparative Example 2 Composition 17 | Comparative Example 3 Composition 18 | Comparative Example 4 Composition 19 | Comparative Example 5 Composition 20 | Comparative Example 6 Composition 21 |
|---|---|---|---|---|---|---|---|---|
| Blend (g) | Latex for adhesive composition (A) | A-1 | | | | | | |
| | | A-2 | | | | | | |
| | | A-3 | | | | | | |
| | | A-4 | | | | | | 70.00 |
| | | A-5 | | | | | | |
| | | A-6 | | | | | | |
| | | A-7 | | | | | | |
| | | A-8 | | | | | | |
| | | X-1 | 35.0 | | | | | |
| | | X-2 | | 35.0 | | 49.0 | | |
| | | X-3 | | | 35.0 | | | |

TABLE 3-continued

|  |  |  |  |  |  |  |  |
|---|---|---|---|---|---|---|---|
|  | Chloroprene based polymer latex (B) | SD130 SD77S | 31.8 | 31.8 | 31.8 | 19.1 | 63.6 |
|  | pH modifier | Glycine | 0.3 | 0.3 | 0.3 | 0.3 | 0.3 | 0.3 |
|  | Solid content ratio (A)/(B) |  | 50/50 | 50/50 | 50/50 | 25/75 | 0/100 | 100/0 |
| Results | Contact property (number of times) |  | 4.0 | 3.2 | 4.0 | 2.8 | 4.0 | not adhered |
|  | Initial adhesion force | After 30 sec | 2.1 | 2.8 | 2.1 | 4.0 | 4.4 | 0.8 |
|  | (N/12.5 cm$^2$) | After 2 min | 3.0 | 3.1 | 2.8 | 7.0 | 5.1 | 0.6 |
|  | Viscosity (mPa · s) | Initial | 1100 | 540 | 1000 | 360 | 70 | 30 |
|  |  | After storage at 70° C. for 1 week | 1300 | 600 | 1200 | 500 | 80 | 30 |
|  | Viscosity change rate (%) |  | 18.2 | 11.1 | 20.0 | 38.9 | 14.3 | 0.0 |

It was found from the results in Tables 2 and 3 that the adhesive compositions of the present invention (Examples 1 to 15) exhibited the excellent contact property and initial adhesion force, i.e., provided a large adhesion force in a short period of time. On the other hand, it was found that the adhesive compositions containing a latex having an average particle diameter of less than 0.3 μm (Comparative Examples 1 to 4) were inferior in the contact property and initial adhesion force. It was found that the latex (A) or the latex (B) alone (Comparative Examples 5 and 6) exhibited no contact property and the significantly low initial adhesion force.

Production of Latex (A)

The components used in Synthesis Examples 101 to 111 are as follows.

[Ethylenic Unsaturated Monomer constituting Polymer (a1)]
(1) Methacrylic acid: produced by Nippon Shokubai Co., Ltd.
(2) Itaconic acid: produced by Fuso Chemical Co., Ltd.
(3) Aconitic acid: produced by Tokyo Kasei Kogyo Co., Ltd.
(4) Styrene: produced by Idemitsu Kosan Co., Ltd.
(5) Methyl methacrylate: produced by Mitsubishi Rayon Co., Ltd.
(6) 2-Ethylhexyl acrylate: produced by Nippon Shokubai Co., Ltd.
(7) 2-Hydroxyethyl acrylate: produced by Kyoeisha Chemical Co., Ltd.
(8) Glycidyl methacrylate: produced by Dow Chemical Japan Ltd.
(9) Methacryloyloxytrimethoxysilane: produced by Shin-Etsu Silicone Co., Ltd.
(10) Divinylbenzene: produced by Nippon Steel & Sumikin Chemical Co., Ltd.

[Surfactant]
(1) Hitenol (Registered trademark) 08E: produced by Dai-ichi Kogyo Seiyaku Co., Ltd., polyoxyethylene oleyl cetyl ether ammonium sulfate, solid concentration: 100% by mass
(2) Hitenol (Registered trademark) NF-13: produced by Dai-ichi Kogyo Seiyaku Co., Ltd., polyoxyethylene styrenated phenyl ether ammonium sulfate, solid content: 100% by mass
(3) Eleminol (Registered trademark) JS-20: produced by Sanyo Chemical Industries, Ltd., sodium alkylarylsulfosuccinate, solid concentration: 40% by mass

[Other Components]
(1) Magnesium nitrate: produced by Ako Kasei Co., Ltd.
(2) 2-Ethylhexyl thioglycolate: produced by Daicel Chemical Industries, Ltd.
(3) Potassium persulfate: produced by Adeka Corporation
(4) 25% Aqueous ammonia
(5) Potassium hydroxide: produced by Osaka Soda Co., Ltd.

Synthesis Example 101

12.4 g of methacrylic acid, 84.6 g of methyl methacrylate, 384.8 g of 2-ethylhexyl acrylate, 8.7 g of 2-hydroxyethyl acrylate, 0.9 g of glycidyl methacrylate, 1.78 g of Hitenol 08E, 4.2 g of Eleminol JS-20, and 130 g of ion exchanged water were homogeneously emulsified with a homogenizer to provide a monomer emulsion.

125 g of ion exchanged water, 0.32 g of Hitenol 08E, 0.3 g of Eleminol JS-20, 0.6 g of magnesium nitrate, and 1.7 g of 2-ethylhexyl thioglycolate were placed in a 1 L five-neck separable flask and heated to 80° C. under agitation. 0.25 g of potassium persulfate and a 5% by mass portion of the monomer emulsion were added to the separable flask, and then the balance of the monomer emulsion was started to be added dropwise to initiate the reaction. The monomer emulsion was added to the separable flask over 4 hours, and simultaneously an aqueous solution containing 1.65 g of potassium persulfate dissolved in 60 g of ion exchanged water was also added over 4.5 hours. After completing the addition of the potassium persulfate aqueous solution, the mixture was agitated at 80° C. for 1 hour to complete the reaction. After cooling the content of the separable flask, 9.8 g of 25% by mass aqueous ammonia was added to neutralize the system. Thereafter, 173.1 g of ion exchanged water was added to dilute to make a solid content of 50% by mass, resulting in a latex (A-101). The composition, the average particle diameter, pH, and the formaldehyde emission thereof are shown in Table 4.

Synthesis Examples 102 to 111

Latexes (A-102) to (A-109) and (X-101) and (X-102) were obtained by producing in the same manner as in Synthesis Example 101 except that the compositions shown in Table 4 were used. The composition, the average particle diameter, pH, and the formaldehyde emission thereof are shown in Table 4.

Production of Adhesive Composition

In Examples 101 to 117 and Comparative Examples 101 to 104 shown below, the latexes A101 to A109, X101 and X102 prepared in Synthesis Examples 101 to 111 were used as the latex for an adhesive composition (A), and the chloroprene based polymer latexes (B-1) and (B-2) and the pH modifier shown below were used.

Chloroprene based polymer latex (B-1): Showprene (Registered trademark) SD130 (homopolymer latex of chloroprene, produced by Showa Denko K.K., containing sodium rosinate and potassium rosinate, surfactant concentration based on solid content: 2% by mass, solid content: 55% by mass) (shown as SD130 in Tables 5 and 6)

Chloroprene based polymer latex (B-2): Showprene (Registered trademark) SD77S (chloroprene based polymer latex, produced by Showa Denko K.K., containing sodium rosinate and potassium rosinate, solid content: 55% by mass, surfactant concentration based on solid content: 2% by mass) (shown as SD77S in Tables 5 and 6)

pH Modifier: glycine (produced by Showa Denko K.K.)

Example 101

31.8 g of the chloroprene based polymer latex (B-1), 35 g of the latex (A-101), and 0.3 g of glycine as a pH modifier were mixed to provide a composition 101. The composition and the evaluation results thereof are shown in Tables 5 and 6.

Examples 102 to 117 and Comparative Examples 101 to 104

Adhesive compositions 102 to 121 were obtained by producing in the same manner as in Example 101 except that the compositions shown in Tables 5 and 6 were used. The composition and the evaluation results thereof are shown in Tables 5 and 6.

TABLE 4

| | | | Synthesis Example 101 | Synthesis Example 102 | Synthesis Example 103 | Synthesis Example 104 | Synthesis Example 105 | Synthesis Example 106 | Synthesis Example 107 | Synthesis Example 108 | Synthesis Example 109 | Synthesis Example 110 | Synthesis Example 111 |
|---|---|---|---|---|---|---|---|---|---|---|---|---|---|
| Blend (g) | Latex | | A-101 | A-102 | A-103 | A-104 | A-105 | A-106 | A-107 | A-108 | A-109 | X-101 | X-102 |
| | Ethylenic unsaturated monomer constituting polymer (a1) | Ethylenic unsaturated monomer having carboxy group | Methacrylic acid | 12.4 | 12.4 | 12.4 | 9.4 | | 9.4 | 9.4 | 9.4 | 9.4 | | 12.4 |
| | | | Itaconic acid | | | | | 8.3 | | | 9.4 | 9.4 | | |
| | | | Aconitic acid | | | | | | | | | | 85.1 | |
| | | Hydrophobic ethylenic unsaturated monomer | Styrene | 84.6 | 84.6 | 84.6 | 85.1 | 84.9 | 85.0 | 85.1 | 85.0 | 85.0 | 85.1 | 84.6 |
| | | | Methyl methacrylate | 384.8 | 384.8 | 384.8 | 386.9 | 386.0 | 386.3 | 395.7 | 386.3 | 386.3 | 396.3 | 385.7 |
| | | | 2-Ethylhexyl acrylate | 8.7 | 8.7 | 8.7 | 8.8 | 8.8 | 8.8 | | 8.8 | 8.8 | 8.8 | 8.7 |
| | | Ethylenic unsaturated monomer having | 2-Hydroxyethyl acrylate | 0.9 | | | 0.9 | 0.9 | 0.9 | 0.9 | 0.9 | 0.9 | 0.9 | |
| | | | Glycidyl methacrylate | | 0.9 | | | | | | | | | |
| | | Crosslinkable ethylenic unsaturated monomer | Methacryloyloxypropyl methacrylate | | | | | | | | | | | |
| | | | Divinylbenzene | | | 0.9 | | | | | | | | |
| | Surfactant | | Hitenol 08E | 2.1 | 2.1 | 2.1 | 2.1 | 2.1 | 2.1 | 2.1 | 2.1 | 2.1 | 2.1 | 2.1 |
| | | | Hitenol NF-13 | 4.5 | 4.5 | 1.5 | 1.6 | 4.6 | 4.6 | 1.6 | 4.5 | 4.6 | 4.6 | 4.5 |
| | | | Eleminol JS-20 | 0.6 | 0.6 | 0.6 | 0.9 | 0.9 | 1.8 | 0.9 | 1.8 | 1.8 | 0.9 | 0.6 |
| | Others | Divalent or higher salt | Magnesium nitrate | 1.7 | 1.7 | 1.7 | 1.8 | 1.8 | 1.8 | 1.8 | 1.8 | 1.8 | 1.8 | 1.7 |
| | | Chain transfer agent | 2-Ethylhexyl thioglycolate | 1.9 | 1.9 | 1.9 | 1.9 | 1.9 | 1.9 | 1.9 | 1.9 | 1.9 | 1.9 | 1.9 |
| | | Polymerization initiator | Potassium persulfate | 9.8 | 9.8 | 9.8 | 9.8 | 9.8 | 9.8 | 9.8 | 9.8 | 9.8 | 9.8 | 9.8 |
| | | Alkali for neutralization | 25% by mass aqueous ammonia | | | | | | | | | 5.5 | | |
| | | | Potassium hydroxide | | | | | | | | | | | |
| Composition ratio, etc. | Solid content (non-volatile content) (% by mass) | | | 50.0 | 50.0 | 50.0 | 50.0 | 50.0 | 50.0 | 50.0 | 50.0 | 50.0 | 50.0 | 50.0 |
| | Ethylenic unsaturated monomer having carboxy group in total monomers (% by mass) | | | 2.5 | 2.5 | 2.5 | 1.9 | 1.9 | 1.9 | 1.9 | 1.9 | 1.9 | 1.9 | 2.5 |
| | Surfactant per 100 parts by mass of total monomers (parts by mass) | | | 0.8 | 0.8 | 0.8 | 0.8 | 0.8 | 0.8 | 0.8 | 0.8 | 0.8 | 0.8 | 0.8 |
| | (A) Number of carboxy group contained in 1 kg of solid content (mol) | | | 0.29 | 0.29 | 0.29 | 0.29 | 0.29 | 0.29 | 0.29 | 0.29 | 0.29 | 0.29 | 0.29 |
| Results | Average particle diameter (μm) | | | 0.34 | 0.35 | 0.34 | 0.55 | 0.51 | 0.68 | 0.57 | 0.69 | 0.69 | 0.55 | 0.35 |
| | Neutralization degree | | | 1.0 | 1.0 | 1.0 | 1.0 | 1.0 | 1.0 | 1.0 | 1.0 | 0.7 | 1.0 | 1.0 |
| | pH | | | 9.4 | 9.3 | 9.3 | 8.5 | 8.3 | 8.5 | 7.9 | 7.6 | 5.5 | 8.5 | 9.3 |
| | Formadehyde emission (mg/L) | | | 0.01 | 0.01 | 0.01 | 0.01 | 0.01 | 0.01 | 0.01 | 0.01 | 0.01 | 0.01 | 0.01 |

TABLE 5

|  |  |  | Example 101 Composition 101 | Example 102 Composition 102 | Example 103 Composition 103 | Example 104 Composition 104 | Example 105 Composition 105 |
|---|---|---|---|---|---|---|---|
| Blend (g) | Latex for adhesive composition (A) | A-1 | 35.0 | 35.0 | | | |
| | | A-2 | | | 35.0 | 35.0 | |
| | | A-3 | | | | | 35.0 |
| | | A-4 | | | | | |
| | | A-5 | | | | | |
| | | A-6 | | | | | |
| | | A-7 | | | | | |
| | | A-8 | | | | | |
| | | X-1 | | | | | |
| | | X-2 | | | | | |
| | | X-3 | | | | | |
| | Chloroprene based polymer latex (B) | SD130 | 31.8 | | 31.8 | | 31.8 |
| | | SD77S | | 31.8 | | 31.8 | |
| | pH modifier | Glycine | 0.3 | 0.3 | 0.3 | 0.3 | 0.3 |
| | Solid content ratio (A)/(B) | | 50/50 | 50/50 | 50/50 | 70/30 | 25/75 |
| Results | Contact property (number of times) | | 2.0 | 2.0 | 2.0 | 2.0 | 2.0 |
| | Initial adhesion force (N/12.5 cm$^2$) | After 30 sec | 7.0 | 6.0 | 6.9 | 5.0 | 6.9 |
| | | After 2 min | 10.6 | 11.0 | 11.0 | 11.0 | 12.1 |
| | Viscosity (mPa · s) | Initial | 860 | 900 | 860 | 900 | 870 |
| | | After storage at 70° C. for 1 week | 900 | 1100 | 900 | 1100 | 900 |
| | Viscosity change rate (%) | | 4.7 | 22.2 | 4.7 | 22.2 | 3.4 |

|  |  |  | Example 106 Composition 106 | Example 107 Composition 107 | Example 108 Composition 108 | Example 109 Composition 109 | Example 110 Composition 110 |
|---|---|---|---|---|---|---|---|
| Blend (g) | Latex for adhesive composition (A) | A-1 | | | | | |
| | | A-2 | | | | | |
| | | A-3 | 35.0 | | | | |
| | | A-4 | | 35.0 | 35.0 | | |
| | | A-5 | | | | 35.0 | 35.0 |
| | | A-6 | | | | | |
| | | A-7 | | | | | |
| | | A-8 | | | | | |
| | | X-1 | | | | | |
| | | X-2 | | | | | |
| | | X-3 | | | | | |
| | Chloroprene based polymer latex (B) | SD130 | | 31.8 | | 31.8 | |
| | | SD77S | 31.8 | | 31.8 | | 31.8 |
| | pH modifier | Glycine | 0.3 | 0.3 | 0.3 | 0.3 | 0.3 |
| | Solid content ratio (A)/(B) | | 50/50 | 50/50 | 50/50 | 50/50 | 50/50 |
| Results | Contact property (number of times) | | 2.0 | 1.4 | 1.6 | 1.5 | 1.6 |
| | Initial adhesion force (N/12.5 cm$^2$) | After 30 sec | 6.1 | 17.8 | 15.0 | 19.0 | 18.1 |
| | | After 2 min | 10.0 | 23.6 | 21.2 | 25.4 | 23.1 |
| | Viscosity (mPa · s) | Initial | 890 | 40 | 40 | 40 | 40 |
| | | After storage at 70° C. for 1 week | 1100 | 35 | 38 | 35 | 38 |
| | Viscosity change rate (%) | | 23.6 | −12.5 | −5.0 | −12.5 | −5.0 |

TABLE 6

|  |  |  | Example 111 Composition 111 | Example 112 Composition 112 | Example 113 Composition 113 | Example 114 Composition 114 | Example 115 Composition 115 |
|---|---|---|---|---|---|---|---|
| Blend (g) | Latex for adhesive composition (A) | A-101 | | | | | |
| | | A-102 | | | | | |
| | | A-103 | | | | | |
| | | A-104 | | | | | |
| | | A-105 | | | | | |
| | | A-106 | 35.0 | 35.0 | | | |
| | | A-107 | | | 35.0 | | |
| | | A-108 | | | | 35.0 | |
| | | A-109 | | | | | 35.0 |
| | | X-101 | | | | | |
| | | X-102 | | | | | |

TABLE 6-continued

| | | | | | | | |
|---|---|---|---|---|---|---|---|
| | Chloroprene based polymer latex (B) | SD130 | 31.8 | | 31.8 | 31.8 | 31.8 |
| | | SD77S | | 31.8 | | | |
| | pH modifier | Glycine | 0.3 | 0.3 | 0.3 | 0.3 | 0.3 |
| | Solid content ratio (A)/(B) | | 50/50 | 50/50 | 50/50 | 50/50 | 50/50 |
| Results | Contact property (number of times) | | 1.0 | 1.2 | 1.5 | 1.0 | 1.0 |
| | Initial adhesion force | After 30 sec | 25.6 | 18.2 | 12.3 | 27.8 | 27.8 |
| | (N/12.5 cm²) | After 2 min | 28.5 | 25.0 | 21.2 | 28.3 | 28.3 |
| | Viscosity (mPa · s) | Initial | 40 | 40 | 42 | 41 | 41 |
| | | After storage at 70° C. for 1 week | 36 | 37 | 40 | 37 | 37 |
| | Viscosity change rate (%) | | −10.0 | −7.5 | −4.8 | −9.8 | −9.8 |

| | | | Example 116 Composition 116 | Example 117 Composition 117 | Example 118 Composition 118 | Example 119 Composition 119 | Example 120 Composition 120 | Example 121 Composition 121 |
|---|---|---|---|---|---|---|---|---|
| Blend (g) | Latex for adhesive composition (A) | A-101 | | | | | | |
| | | A-102 | | | | | | |
| | | A-103 | | | | | | |
| | | A-104 | | | | | | |
| | | A-105 | | | | | | |
| | | A-106 | | | | | | |
| | | A-107 | | | | | | |
| | | A-108 | | | | | | |
| | | A-109 | | | | | | |
| | | X-101 | | 35.0 | | | | |
| | | X-102 | | | 35.0 | | | |
| | Chloroprene based polymer latex (B) | SD130 | 19.1 | 44.5 | 31.8 | 31.8 | 63.6 | |
| | | SD77S | | | | | | |
| | pH modifier | Glycine | 0.3 | 0.3 | 0.3 | 0.3 | 0.3 | 0.3 |
| | Solid content ratio (A)/(B) | | 70/30 | 25/75 | 50/50 | 50/50 | 0/100 | 100/0 |
| Results | Contact property (number of times) | | 2.0 | 1.0 | — | 4.0 | 4.0 | not adhered |
| | Initial adhesion force | After 30 sec | 14.6 | 30.2 | — | 3.5 | 4.4 | 0.8 |
| | (N/12.5 cm²) | After 2 min | 17.2 | 32.1 | — | 5.1 | 5.1 | 0.6 |
| | Viscosity (mPa · s) | Initial | 40 | 45 | gelled | 1000 | 70 | 30 |
| | | After storage at 70° C. for 1 week | 30 | 42 | — | 1200 | 80 | 30 |
| | Viscosity change rate (%) | | −25.0 | −6.7 | — | 20.0 | 14.3 | 0.0 |

It was found from the results in Tables 5 and 6 that the adhesive compositions of the present invention (Examples 101 to 117) exhibited the excellent contact property and initial adhesion force, i.e., provided a large adhesion force in a short period of time. On the other hand, the adhesive composition 118 of Comparative Example 101 using the latex for an adhesive composition (X-101) that did not contain a structural unit derived from an ethylenic unsaturated monomer having a carboxy group in the polymer (a1) was gelled, and was unable to measure for viscosity, contact property, and initial adhesion force. The adhesive composition 119 of Comparative Example 102 using the latex for an adhesive composition (X-102) that did not contain a structural unit derived from a crosslinkable ethylenic unsaturated monomer in the polymer (a1) had a high viscosity and was insufficient in contact property and initial adhesion force. It was found that the latex (A) or the latex (B) alone (Comparative Examples 103 and 104) exhibited no contact property and the significantly low initial adhesion force.

The invention claimed is:

1. An adhesive composition comprising a latex for an adhesive composition (A) and a chloroprene based polymer latex (B),
wherein the latex for an adhesive composition (A) comprises a polymer of an ethylenic unsaturated monomer (a1), a surfactant (a2), a divalent or higher valent metal salt, and an aqueous medium, the polymer of an ethylenic unsaturated monomer (a1) having a carboxy group, and the polymer of an ethylenic unsaturated monomer (a1) having an average particle diameter of 0.30 to 5.00 µm measured by dynamic light scattering, and
wherein the polymer of an ethylenic unsaturated monomer (a1) has a structural unit derived from an ethylenic unsaturated monomer having a carboxy group and a structural unit derived from an ethylenic unsaturated monomer having a functional group having reactivity with a carboxy group,
provided that the adhesive composition is not an acrylic-based pressure sensitive adhesive composition.

2. The adhesive composition according to claim 1, wherein the chloroprene based polymer latex (B) contains an anionic surfactant having a carboxy group.

3. The adhesive composition according to claim 1, wherein the adhesive composition has a mixing ratio of the latex for an adhesive composition (A) and the chloroprene based polymer latex (B) in terms of mass ratio of solid contents of 10/90 to 90/10.

4. The adhesive composition according to claim 1, wherein the adhesive composition has a mixing ratio of the latex for an adhesive composition (A) and the chloroprene based polymer latex (B) in terms of mass ratio of solid contents of 25/75 to 70/30.

5. The adhesive composition according to claim 1, wherein the adhesive composition further comprises a pH modifier.

6. An article comprising porous members, or a porous member and another member, adhered with the adhesive composition according to claim 1.

7. An article comprising water-absorbing members, or a water-absorbing member and another member, adhered with the adhesive composition according to claim 1.

8. A member for furniture and automobile interior, comprising the article according to claim 6 as a cushion material.

9. An adhesive composition comprising a latex for an adhesive composition (A) and a chloroprene based polymer latex (B),
wherein the latex for an adhesive composition (A) comprises a polymer of an ethylenic unsaturated monomer (a1), a surfactant (a2), a divalent or higher valent metal salt, and an aqueous medium, the polymer of an ethylenic unsaturated monomer (a1) having a carboxy group, and the polymer of an ethylenic unsaturated monomer (a1) having an average particle diameter of 0.30 to 5.00 μm measured by dynamic light scattering, and
wherein the polymer of an ethylenic unsaturated monomer (a1) is a polymer of an ethylenic unsaturated monomer ($a_1$1), and the polymer of an ethylenic unsaturated monomer ($a_1$1) is constituted by a hydrophobic ethylenic unsaturated monomer selected from styrene derivative, a (meth)acrylate ester, a fumarate ester, a maleate ester, a vinyl ester, an N-substituted maleimide compound, an itaconate ester, a crotonate ester, and a phthalate ester, and the hydrophobic ethylenic unsaturated monomer is contained in an amount of 50.0 to 99.5% by mass based on all ethylenic unsaturated monomers constituting the polymer of an ethylenic unsaturated monomer ($a_1$1),
provided that the adhesive composition is not an acrylic-based pressure sensitive adhesive composition.

10. The adhesive composition according to claim 9, wherein the chloroprene based polymer latex (B) contains an anionic surfactant having a carboxy group.

11. The adhesive composition according to claim 9, wherein the adhesive composition has a mixing ratio of the latex for an adhesive composition (A) and the chloroprene based polymer latex (B) in terms of mass ratio of solid contents of 10/90 to 90/10.

12. The adhesive composition according to claim 9, wherein the adhesive composition has a mixing ratio of the latex for an adhesive composition (A) and the chloroprene based polymer latex (B) in terms of mass ratio of solid contents of 25/75 to 70/30.

13. The adhesive composition according to claim 9, wherein the adhesive composition further comprises a pH modifier.

14. An article comprising porous members, or a porous member and another member, adhered with the adhesive composition according to claim 9.

15. An article comprising water-absorbing members, or a water-absorbing member and another member, adhered with the adhesive composition according to claim 9.

16. A member for furniture and automobile interior, comprising the article according to claim 14 as a cushion material.

17. The adhesive composition according to claim 1, wherein the divalent or higher valent metal salt is a magnesium salt or an aluminum salt.

18. The adhesive composition according to claim 9, wherein the divalent or higher valent metal salt is a magnesium salt or an aluminum salt.

19. The adhesive composition according to claim 1, wherein the divalent or higher valent metal salt is magnesium nitrate.

20. The adhesive composition according to claim 9, wherein the divalent or higher valent metal salt is magnesium nitrate.

21. An adhesive method for adhering adherends, which comprises coating an adhesive composition as a liquid on an adherend, then adhering the adherend to another adherend, and then drying the adherends,
wherein the adhesive composition is an adhesive composition according to claim 1, and
wherein the adhesive composition contains an aqueous medium containing water.

22. An adhesive method for adhering adherends, which comprises coating an adhesive composition as a liquid on an adherend, then adhering the adherend to another adherend, and then drying the adherends,
wherein the adhesive composition is an adhesive composition according to claim 9, and
wherein the adhesive composition contains an aqueous medium containing water.

23. The adhesive composition according to claim 1, wherein the average particle size of the polymer of an ethylenic unsaturated monomer (a1) as measured by dynamic light scattering is 0.50 to 2.00 μm.

24. The adhesive composition according to claim 9, wherein the average particle size of the polymer of an ethylenic unsaturated monomer (a1) as measured by dynamic light scattering is 0.50 to 2.00 μm.

25. The adhesive composition according to claim 1, wherein the polymer of an ethylenic unsaturated monomer (a1) has a structural unit derived from an ethylenic unsaturated monomer having a carboxy group, an ethylenic unsaturated monomer having a hydroxy group reactive with a carboxy group, and an ethylenic unsaturated monomer having a glycidyl group reactive with a carboxy group.

26. The adhesive composition according to claim 9, wherein the polymer of an ethylenic unsaturated monomer (a1) has a structural unit derived from an ethylenic unsaturated monomer having a carboxy group, an ethylenic unsaturated monomer having a hydroxy group reactive with a carboxy group, and an ethylenic unsaturated monomer having a glycidyl group reactive with a carboxy group.

* * * * *